(12) United States Patent
Pettersson et al.

(10) Patent No.: US 8,875,655 B2
(45) Date of Patent: Nov. 4, 2014

(54) GRAPHICAL APPLICATION SYSTEM

(75) Inventors: Bo Pettersson, London (GB); Klaus Schneider, Dornbirn (AT); Benedikt Zebhauser, Rorschach (CH); Knut Siercks, Moerschwil (CH)

(73) Assignee: Hexagon Technology Center GmbH, Heerbrugg (CH)

( * ) Notice: Subject to any disclaimer, the term of this patent is extended or adjusted under 35 U.S.C. 154(b) by 183 days.

(21) Appl. No.: 13/425,118

(22) Filed: Mar. 20, 2012

(65) Prior Publication Data

US 2012/0219699 A1 Aug. 30, 2012

Related U.S. Application Data

(63) Continuation-in-part of application No. PCT/EP2011/066356, filed on Sep. 20, 2011.

(30) Foreign Application Priority Data

Sep. 22, 2010 (EP) .................................... 10178353

(51) Int. Cl.
| | | |
|---|---|---|
| B05C 11/10 | (2006.01) | |
| G06F 19/00 | (2011.01) | |
| B05B 13/04 | (2006.01) | |
| G01B 11/00 | (2006.01) | |
| B05B 12/12 | (2006.01) | |
| G01S 5/02 | (2010.01) | |
| H04N 13/02 | (2006.01) | |
| B05B 12/08 | (2006.01) | |
| G01S 19/38 | (2010.01) | |

(52) U.S. Cl.
CPC .............. B05B 12/124 (2013.01); B05B 13/04 (2013.01); G01B 11/002 (2013.01); G01S 5/02 (2013.01); H04N 13/0246 (2013.01); B05B 12/122 (2013.01); B05B 12/084 (2013.01); G01S 19/38 (2013.01)
USPC ............................. 118/713; 118/712; 700/98

(58) Field of Classification Search
USPC ......... 118/300, 313–315, 712, 713, 321, 323, 118/679; 427/427.1, 8, 9; 239/71, 73, 67; 382/154
See application file for complete search history.

(56) References Cited

U.S. PATENT DOCUMENTS

| | | | |
|---|---|---|---|
| 5,935,657 | A | 8/1999 | Melendez |
| 6,299,934 | B1 | 10/2001 | Manning |

(Continued)

FOREIGN PATENT DOCUMENTS

| | | |
|---|---|---|
| DE | 10 2008 015 258 | 9/2009 |
| FR | 2 785 230 | 5/2000 |

(Continued)

OTHER PUBLICATIONS

International Search Report and Written Opinion mailed Dec. 7, 2011 as received in PCT International Application No. PCT/EP2011/066356.

(Continued)

*Primary Examiner* — Yewebdar Tadesse
(74) *Attorney, Agent, or Firm* — Maschoff Brennan

(57) ABSTRACT

A graphical application system, with a surface spattering device, with at least one nozzle for expelling a spattering material onto a target surface, a nozzle control mechanism controls expelling of the nozzle. A spatial referencing unit references the spattering device in space and a computation means automatically controls the nozzle according to information from the spatial referencing unit and according to predefined desired spattering data as a digital image or a CAD-model of a desired pattern to be spattered onto the target surface. A communication means for establishing a communication link from the spatial referencing unit to the computation means to supply the position and orientation to the computation means. The spatial referencing unit is located remote from the spattering device and comprises at least two optical 2D cameras arranged with a stereobasis, for determining the position and orientation of images taken by the cameras.

15 Claims, 6 Drawing Sheets

(56) References Cited

U.S. PATENT DOCUMENTS

| | | | |
|---|---|---|---|
| 7,180,660 B2* | 2/2007 | Hauger et al. | 359/378 |
| 7,350,890 B2 | 4/2008 | Baird et al. | |
| 7,922,272 B2 | 4/2011 | Baird et al. | |
| 8,036,452 B2* | 10/2011 | Pettersson et al. | 382/154 |
| 8,244,030 B2* | 8/2012 | Pettersson et al. | 382/154 |
| 2005/0100680 A1* | 5/2005 | Bustgens | 427/427.1 |
| 2005/0242205 A1 | 11/2005 | Jarvis | |
| 2007/0086021 A1 | 4/2007 | Teichman | |
| 2007/0209586 A1 | 9/2007 | Ebensberger et al. | |
| 2008/0152807 A1 | 6/2008 | Baird et al. | |
| 2009/0022879 A1 | 1/2009 | Bustgens et al. | |
| 2009/0179081 A1 | 7/2009 | Charpie | |
| 2010/0304009 A1 | 12/2010 | Bausen et al. | |
| 2011/0199431 A1 | 8/2011 | Baird et al. | |

FOREIGN PATENT DOCUMENTS

| | | |
|---|---|---|
| FR | 2 850 322 | 7/2004 |
| JP | 10-264060 | 10/1998 |
| JP | 2006-320825 | 11/2006 |
| KR | 10-2006-0009588 A | 2/2006 |
| KR | 100812725 | 3/2008 |
| WO | 82/00906 | 3/1982 |
| WO | 2005/018813 A2 | 3/2005 |
| WO | 2012/038446 A1 | 3/2012 |

OTHER PUBLICATIONS

European Search Report dated Feb. 2, 2011 as received in European Application No. EP 10 17 8353.

Extended European Search Report dated Aug. 31, 2012 as received in Application No. 12160353.4.

* cited by examiner

GRAPHICAL APPLICATION SYSTEM

CROSS REFERENCE TO RELATED APPLICATIONS

This patent application is a continuation-in-part of PCT/EP2011/066356 filed Sep. 20, 2011, which claims priority to European Patent Application No. 10178353.8 filed on Sep. 22, 2010. The contents of this PCT patent application and this European Patent Application are both hereby incorporated by reference herein.

FIELD OF THE INVENTION

The present invention relates generally to a graphical application system, to a graphical application method and to a computer program product.

BACKGROUND

The desire to apply a layer of spattering material onto a target surface is spread over a lot of different technological areas. There are various reasons for apply spattering materials to surfaces, with the most common being the desire to protect the surface against environmental influence or to fulfil aesthetic demands such as the desire to apply certain, often multi-coloured, graphical patterns onto the surface or on certain areas of the surface. The spattering as a process can include or be painting, coating, plating, inking, cladding, varnishing, spraying, sprinkling, texturing, overcoating, colouring, tinting or staining by expelling material to be applied to a target surface from a nozzle means.

The technical areas wherein such painting, spattering, inking, dyeing or coating is desired, range for example from construction work, advertising, amusement, camouflaging, machinery building, road marking, markings on sport grounds, indoor and outdoor wall claddings, car manufacturing, furniture production, etc. Also, a repair of already—at least partially—spattered surfaces which are worn out, damaged, sabotaged, partly replaced, etc. is often required, wherein special care must be taken to achieve a high degree of colour matching and also smooth and optically uniform transitions from the old to the new spattering.

The most common types of spatterings are powder coatings and paint-sprayings by airbrushes or painting guns, but there are many other different types of spatterings like for example sprayed plaster as known from boat construction, sprayed mineral wool, sprayed or gunned concrete, sprayed asbestos, underbody coating as known from cars or other spatterwork. Also sandblasting is a very similar field of the art wherein, instead of covering a surface by spattering material, the surface is eroded by an expelled jet of erosive material with almost analogous principles as used in spattering.

The document FR 2 850 322 discloses a device for printing an image on a large surface that may be held and moved manually and is able to determine position and direction on a surface. The device uses this knowledge of its current position to determine which colour needs to be applied on the surface. This determination is accomplished by matching the determined coordinates and an image stored in a memory of the device. The stored image may then be superimposed to the surface to be painted.

In U.S. Pat. No. 6,299,934, a GPS controlled paint spray system comprises a paint sprayer driver program and a GPS paint sprayer. The GPS paint sprayer includes a GPS receiver, a geographical converter for enabling a user to convert a drawing pattern to geographical locations, a location comparator for detecting a location match between the geographical locations of the drawing pattern and a current GPS-based location, and a spray nozzle to spray paint at matched locations. Said geographical drawing pattern can be marked onto either a field, a wall, or a parking lot.

US 2009/0022879 relates to a method for applying paints or varnishes to large surfaces by means of a displaceable, paint applying device which is controlled in a position-dependent manner. Said device comprises a displaceable part of a real time position measuring system using reference marks.

KR 102006009588 provides a method for controlling an injection position of a painting articulated robot, to automatically operate arm-positions of an articulated robot by remote control so that a painting material exactly injects to an object.

For example in the car industry, the usage of painting robots to paint sheet metal or body parts is common state of the art. The robots for fulfilling such tasks are programmed or taught for that purpose by skilled craftsmen.

In JP 10-264060, a system is provided to perform teaching of movements to a robot arm—by anyone, easily and in a short time—to perform painting by maintaining a painting machine at a right location and attitude, regardless of the skillfulness of a worker. The advancing route of the painting machine is calculated by an image processor, and the location and attitude of the painting machine are calculated by a distance/attitude calculator, based on the output signals of an image sensor and a distance sensor which are together mounted at the tip of a robot arm. In a controller, the control parameter of each axis of the robot arm is outputted to a driving device and the control parameter of each axis of the robot arm, which is moved by the driving device, is stored in a storage device in time sequence, while a feedback control is performed so as to maintain the distance of the painting machine and the painting surface to a prescribed value, to face the painting machine to the painting surface and to move the painting machine along the advancing route.

JP 2006-320825 describes an automatic coating vehicle for painting, e.g. an aircraft, wherein the thickness of the paintwork has to be quite accurate—for once to achieve a sufficient protection of the surface on one hand and to keep the weight of the applied paint as low as possible on the other hand. It includes arm control means to control operation and movement of an arm with an actuator head, and to perform a painting process with respect to a surface to be coated based on the information of the coating area or region stored in a memory means and the attitude and position information of said arm. The position of the vehicle and the head are determined using a GPS, as well as a range finder for measuring a distance between the head and an object.

The document DE 10 2008 015 258 relates to a painting robot for painting motor vehicle bodies by means of a atomizer (also known as nebulizer) for spattering the surface, that is guided by the painting robot. Applying multicolour paint is realized using a paint changer.

FR 2 785 230 refers to a ground logo imprinting technique for graphical reproduction of a drawing reproduced on the ground. The technique traces contours on the ground from a computer driven optical system. The contours traced out are then filled in with jet paint pulverization. The ground logo imprinting technique produces a ground print of a predefined advertising logo or drawing. A stencil, formed by a computer integrated optical system is projected onto the ground and jet paint pulverization is applied to the ground surface.

In KR 100812725 a method for controlling the position and angle of a painting robot is provided to execute painting works at the same spray distance and the progressive speed of a spray target point within an orthogonal painting zone by controlling a spray gun at the proper rotational angular speed, access speed, and separation speed. The goal is to generate a uniform spraying on the surface.

U.S. Pat. No. 5,935,657 discloses a multiple nozzle paint spraying system with two separate banks of spray nozzles. Both banks are supplied by paint from an airless pressurized source, and each individual bank has a shut-off valve to stop the flow of pressurized paint to that respective bank. The entire assembly is mounted on a roller stand which has a pair of arms extending laterally outward. During use, the painter merely activates the paint spray and pushes the apparatus along the wall. The lateral arms maintain the spray nozzles at a fixed distance from the wall, and a coat of paint can be applied to the wall uniformly and quickly.

US 2008/0152807, US 2011/0199431, U.S. Pat. No. 7,350,890 and U.S. Pat. No. 7,922,272 are referring to methods and devices for applying an accurately positioned graphic image on a large contoured surface, such as the body of an aircraft. The apparatus used therein can comprise a rail positioning system to be mounted on a portion of the surface on which the graphic image is to be applied. The graphic image application system is controlled by software to operate a positioning system and a graphic image application system.

The basic principle used in those surface spattering applications is to expel or eject a spattering material such as paint from a nozzle means onto a target surface. To achieve such, there is pressure built up inside or before the nozzle which forces the spattering material out of the nozzle or the spattering material is carried away by a jet of gas or liquid which is ejected through or next to the nozzle. The most common examples for doing so are the ones known from painting guns or airbrushes and the ones known from ink-jet printing.

New ink-jet printer like technology is available to paint with narrow spot sizes of less than one centimeter even from 10 cm distance. Such low divergence expelling techniques allow also spraying without masking, real-time colour mixing or colour changing over the area painted or colour fading from one colour to another.

In cases when the painting tool is handheld or at least partially supported by a guide rail, by a weight compensating arm or the like, one challenge is the control of such a systems in a spattering application as described above.

Applying paint or powder to objects such as walls, industrial structures, manufactured goods like car bodies, large machine parts, aircrafts, etc., as target surfaces is especially difficult in cases where just parts of the surfaces should get painted, for example after repairing or replacing damaged parts or overpainting certain areas only.

Painting a pre-defined pattern such as a logo or an image available as a picture or CAD file, which should be applied to a surface, can be quite demanding. Using an airbrush requires a skilled craftsman, who needs experience and knowledge in the guidance and reliable position and attitude handling of the spattering, painting or powdering tool as well as knowledge of paint viscosity, drying conditions and various other parameters during labour.

In case of repairing or adding paint to already painted surfaces, it can also be quite time consuming to find out the already present colour type and kind as well as its thickness in advance of labour. Also, to buy or self-mix the matching colour requires a skilled worker, in particular when doing so at the worksite.

Non-flat (3D) surfaces are a further challenge as well as sudden interruptions of the target surface which need to be spattered, for example walls to be painted which comprise cables or pipes mounted on the surface which have to be avoided or an aeroplane-body comprising windows which should be excluded from painting.

For the application of spattering material according to a desired spattering data, a spatial referencing of the application-unit with respect to the target surface has to be established. Especially in case of targets with large scales, a spatial referencing of the spattering unit over the whole target range is required to achieve such.

SUMMARY

It is therefore an object of the present invention to provide an improved graphical application system or surface spattering system for applying a graphical application onto a target surface.

A further object of the present invention is to provide an improved surface spattering system which can spatter the target according to a desired spattering data by a spatial referencing of the spattering device with respect to the target surface.

A further object is to provide a surface spattering system which aids the user in fulfilling the spattering tasks and to achieve the desired spattering results and characteristics, in particular over large target areas.

A special object of the invention is to aid a user in accurately applying a predefined spattering pattern onto a target surface by a spattering device.

A further object of the invention is to provide a system comprising a nozzle means which is capable of automatic adjusting its expelling characteristics dependent on its spatial reference and the characteristics of the target surface such as e.g. target-shape, present spattering colour, present spattering thickness, present spattered and non-spattered areas, temperature, etc.

A particular object of the invention is to provide a system which avoids the need of pre mixing spattering materials to desired colour or material characteristics and also omit or reduce the thereby involved exchange and cleaning process effort.

Another particular object of the invention is to automatically adjust the expelling characteristics of a spattering device, dependent on the present spattering task and the spatial location and movement of the device relative to the target which is determined by a spatial referencing unit that is simple to set up.

Its an special object to achieve a spatial referencing by simple means which are easy to set up and operate.

These objects are achieved by realising the features of the independent claims. Features which further develop the invention in an alternative or advantageous manner are described in the dependent patent claims.

A graphical application system with a movable surface spattering device, comprising at least one nozzle means for an expelling of a spattering material onto a target surface is presented. The expelling can be continuous, resulting in an uninterrupted stream of spattering material, or pulsed by ejecting small separated portions or drops of material, whereby in case of high pulses-repetition frequency the pulsed-ejection can also be interpreted as a quasi-continuous stream of spattering material.

The spattering device comprises a nozzle control mechanism to control characteristics of the expelling of the nozzle means, in particular expelling-direction, -speed, -divergence, -spreading, -shape and/or -material rate, pulse timing, pulse duration and pulse repetition. For providing the spattering material to be ejected, the spattering device comprises a spattering material supply which can be linked to an internal or external material tank. A storage comprises desired spattering data, which can be embodied as a fixed installed memory means, as a slot for receiving a memory card, USB-Stick or the like as well as wired or wireless network storage. The desired spattering data is predefined and comprised in a digital image or CAD-model memorized on the storage.

A spatial referencing unit is located externally of the spattering device and references the spattering device relative to the target surface, in particular in at least five degrees of freedom by position and angle.

A computation means to automatically control the expelling by the nozzle control mechanism according to information gained by the spatial referencing unit and according to the desired spattering data.

The computation means is built in such a way that an actual or forecasted spattering spot, as the actual of forecasted spatterable area on the target surface, is evaluated and adjusted by changing the characteristics of expelling of the nozzle means in such a way that the target surface is spattered according to the desired spattering data. The spattering spot is thereby primarily dependent on the actual or forecasted spatial reference of the spattering device, the actual or forecasted set of characteristics of the expelling of the nozzle means and a actual measured, calculated or forecasted distance and inclination of the nozzle means relative to the target surface.

The characteristics of expelling of the nozzle means is controlled according to a determined presently spatterable area on the target surface, which is dependent on the spatial reference of the spattering device, the direction of the expelling of the nozzle means and a measured distance from the nozzle means to the target surface, in a way to achieve a spattering of the target surface according to the desired spattering data.

The computation means is built in such a way to control the nozzle means for a preferably unmasked application of the spattering material to the target surface according to the desired spattering data.

Besides an expelling of spattering material by pressure which is used to force the spattering material out of the nozzle means, there are other systems that are "throwing" drops of spattering material, in particular with a very high repetition frequency.

Other expelling systems are "sucking" the spattering material out of the nozzle means by a bypassing jet of air or gas building up a negative pressure and carrying away the spattering material in direction of the target.

In particular, the presently spatterable area can be defined as the portion of the target surface that would be hit by a then expelled spattering material in form of a drop, a stream of drops or a continuous stream of material from the nozzle means towards the target surface in the present direction of expelling and the present divergence of the stream as examples of characteristics of the expelling.

In case the divergence of the expelled spattering material jet is unequal to zero the size of presently spatterable area on the target surface is dependent on this divergence and on the distance between the nozzle means looked at and the target surface. The shape of the presently spatterable area on the target surface can further be dependent on the inclination of the direction of expelling relative to the target surface.

In one embodiment, the spattering device could be a handheld painting gun which automatically adjusts the expelling characteristics of the nozzle(s) according to the distance and/or inclination to the target surface to achieve a desired coating of the target surface by the spattering material. The spattering device can also comprise an automatic positioning of the nozzle means relative to a body of the spattering device within a certain region, for example embodied in form of 2D plotter device allowing a Cartesian positioning of the nozzle within a frame of the device.

Nevertheless, either the body of the spattering device or the nozzle itself has still to be referenced with respect to the target surface. This is particularly true, if the desired spattering data outreaches the positioning range of the nozzle within the spattering device. In such a case, the spattering device requires a relocation with respect to the target surface to achieve an accurate stitching of the multiple parts of the desired spattering pattern which results from the relocation of the device. Therefore, a spatial referencing of the spattering device, in particular of its body, has to be established by the spatial referencing unit according to the present invention. The referencing of the nozzle to the target can be established in a step wise approach, for example by a first referencing the spattering device's body with respect to the target surface according to the invention, and a second referencing of the nozzle means to the device's body by a motorized positioning unit with position sensor. In another embodiment, not the body of the spattering device the nozzle means itself can be directly referenced according to the present invention, regardless whether the nozzle is positionable within the spattering device or the whole spattering with its nozzle(s) is movable.

In another embodiment, the spattering process can for example be further observed by an imaging unit at the spattering device, aligned in direction of the nozzle means, to verify the progress and to compare it with the desired result. For example, a monitoring of the full coverage of the desired area on the target surface can be accomplished and—if required—the expelling characteristic can be adjusted in such a way to achieve the desired spattering results.

An example of a spattering task is the spraying of a paint pattern such as a logo of a company, advertising graphics or other textual or graphical items onto a target surface by manually running the painting device over a wall, ground, ceiling, sheet metal, vehicle part or another target object. According to the invention, this can be done indoors as well as outdoors, in particular by a setup which allows easy handling and erecting, also at remote sites. In case of rechargeable batteries and/or air tanks, it is also possible to use the spattering device even in difficult to access or remote areas where a power supply is quit difficult to establish.

In a basic version, the spattering device, or more concrete a computation device at or associated to the spattering device, decides whether or not to expel or spray spattering material like paint, based on the spatial reference of the nozzle relative to the target. Therefore, the spatial referencing unit communicates data comprising position and orientation information to the computation device. In the decision whether to spray paint or not, the device incorporates information of the desired spattering data, like whether the present area should be painted, should remain unpainted or has already been painted.

The spattering device or the associated computation means can comprise a data storage wherein a history of locations of already spattered areas is stored online while spattering. The storage also comprises the desired spattering data, which is stored as a spatially dependent desired pattern to be applied to the target. So desired spattering data does not only mean information regarding a plain, smooth, uniform covering of a target surface with a single spattering material, as e.g. in classic paint gun spraying of single coloured car bodies, but a spattering more comparable to the art of airbrush painting for applying patterns like in colourizing model making, billboard painting, text or lettering applications to surfaces or the like.

The desired pattern to be applied to the target can be based on a digital CAD like design of the pattern. If necessary, for example in case of curved target surfaces or surrounding or objects, which define where to start spattering, where to stop, etc. can also be comprised in the digital design or model, which can be represented in a two or three dimensional model.

The control of the spattering process, which is dependent on the expelling of the spattering material, which is done by a means herein referred to as nozzle, has certain characteristics like expelling direction, divergence, pressure, speed, material rate, etc. some of which can be fixed as well as variably controlled by a nozzle control mechanism. In a simple case, this is an on/off control, but there are many advanced methods known to influence the expelling, in particular in the technical area of airbrushes, painting guns or ink-jet printing.

To achieve the desired spattering results, knowledge about the type, kind, colour and/or viscosity of the spattering material as well as environmental the parameters influencing the drying or curing of the spattering material can be incorporated in the automatic control of the nozzle's characteristics as explained in detail below. The control of the spattering process can further be dependent on information regarding the presently used spattering material which information can comprise colour, type, viscosity, etc. This information can either be entered manually or determined automatically.

According to the spatial referencing, painting colour to areas where it has already been previously applied or where it should not be applied can be avoided, wherefore the device can store the areas already painted in a real-time manner, and for example also visualize this by an overlay of the desired spattering data and the actual progress of spattering, for example on a display or projected directly onto the target.

The spattering device can comprise a single or multiple nozzle means, e.g. aligned in rows or spraying bars. The nozzle control mechanism can adjust each single nozzle in a short reaction time. In other embodiments, the nozzle characteristics can also be adjusted for multiple nozzles by a single actuator. To reduce the influence of the still remaining reaction time, the control-algorithm for the nozzles can comprise a prediction of the reaction time.

In particular in a hand guided embodiment of the spattering device, the high dynamics and uncertainties of the guidance can be overcome or at least reduced by a correction of the expelling characteristics like painting pressure, jet width and direction in real-time. For example, the expelling direction can be adjusted either by angular adjustments of the nozzles expelling direction, in particular by some mechanical micro drives or by adjusting the nozzle shape or injecting air from the sides. Also, the shape of the ejected stream of material can be influenced by the nozzle control mechanism, for example by hydrodynamic means like injecting air from different sides to shape the jet of spattering material into a desired profile or direction or by mechanical means like shaping and/or moving the nozzle. The uncertainties and high dynamics of a hand guidance can be at least partly compensated by actuating the only the nozzle with high bandwidth. This can for example be assisted by an IMU-Measurement at the spattering device which allows a high bandwidth and therefore fast reaction times in compensating dynamic hand movements.

Controlling the dynamics of the driving of the spattering tool, in particular changes of distance, angle and speed of the painting/powdering tool relative to the surface to be painted, can be used as a basis for adapting the spraying power, pressure, jet width or direction of a nozzle (if those characteristics are variable in this special tool).

In case of a multiple nozzle device the coordinate, direction and/or distance to the target surface of each of the nozzles can be determined to individually adjust each nozzle characteristic. This can be assisted by an additional sensor for position and orientation being of a bar type as well.

Multiple nozzle or injection systems that work like magnified inkjet printers allow to apply colours by applying a set of primary colours like RGB, CMYK, HSV, etc., which may be extended by some special colours like black and white, or spot colours like gold, silver, clear coatings, etc. The colours to be used for a certain task can be defined according to the desired range and variability of the desired output colours.

There are spattering material ejection systems available on the market, which allow spraying a spot of spattering material in an expelling direction with a spot diameter or size on the target of less than one centimeter from a distance to target which is greater than ten centimeters. The actual sizes of the spots can be adjusted not only by varying the target distance, but also by adjusting the expelling-characteristics of the nozzle which releases the spattering material. This can, for example, be done by varying the expelling pressure, the amount of expelled material, expelling speed, the geometrical shape of the nozzle, by supporting air-jets, etc. which influence the divergence and shape of the spot on the target.

So even in case of varying distances, which can be calculated or measured as described further below, it is possible to achieve a desired spot size on the target surface. Those spots can be ejected with high repetition rates of hundreds of spots per second or even more.

Those new expelling systems can also have advantages regarding the mist-development known from airguns and the resulting health issues and the contamination of the environment which should not get spattered. Also, the need to protect the environment from an undesired escape of spattering material by coverage can be reduced or omitted, wherefore a time consuming masking of target areas which should not be affected can be avoided. Another aspect is an increased utilisation of the spattering material and resulting in reduced costs, environmental pollution and health issues.

The different colours can be applied in a spot cluster or dot-matrix next to each other onto the target surface which can e.g. be a wall, ground, object etc. to achieve either an actual mixing of the colour-material by overlaying the colour spots on the target surface or to achieve the desired colour by aligning small spots of different colours in different sizes, distributions or density next to each other to get the desired colour impression when observed from distance, e.g. as known in the art of paper-printing.

Such systems also allow spraying without masking differently coloured target sections. For certain patterns that are pre-defined (e.g. by a digital image or CAD-drawing) the colours can be mixed beforehand and then loaded into the paint tank which stores the spattering material. The multiple nozzles or injection system can have more than one row of nozzles, for example two for dual colour, three or more for multiple colours. It is possible, but often not necessary, to use a nozzle row for each colour needed in the present design since a mixing of three or four colours (e.g. CMYK—cyan, magenta, yellow plus black; or RGB—red, green, blue plus black; if applied to white ground as known from inkjet-printing) is enough to mix a broad range of colours.

When using pre-mixed colours that should cover the target surface homogenously over quite large section of the target surface, a corresponding number of nozzle rows all expelling the same colour can be used to cover not only a small spot, but also a wider range on the target in one stroke. As the nozzles can be controlled individually, the overall expelling characteristics can be adjusted dependent on the target's shape and desired spraying pattern, e.g. by deactivating certain nozzles or adjusting their ejection width/divergence.

An additional mixing of solvent to achieve a desired viscosity of the spattering material can also be done. Furthermore, an ejection of pure solvent can be used for cleaning purposes of the target surface, of the spattering device or of both of them. This can be done, for example, by one or more valves which allow a selection between spattering material and/or solvent.

If a spattering material is used which is curable by certain environmental influences like ultraviolet radiation or heat, the spattering device can be equipped with a source for such, e.g. an UV-lamp or infrared radiator, which can also be embodied by a laser-source which—at least roughly—covers only the spot which is presently being spattered or had just recently been spattered.

Another kind of spattering material can require a mixing of two or more components to cure. The mixing of those components can either take place inside of the spattering device, in particular inside of the nozzle, or outside in front of one of the nozzles for each of the components or directly on the target surface. For example, it is possible to parallelly spray a fiber material and two components of a two-part-epoxy material like polyester for spattering a target with fibre-reinforced-plastics like GRP or fibreglass. Optionally, the mixing of those three components can also take place inside one nozzle, which then expels the already mixed spattering material.

Other spattering materials can require a pre-heating to liquefy, such as e.g. thermoplastic or wax, whereby the nozzle and the spattering material supply need to be heated, and in some cases also the spattering target needs to be heated, e.g. by infrared, rays in particular by a laser-beam in a similar direction as the ejected spattering material.

In case of multiple-layer-spattering, which is quite common in painting applications, there are also delay times between each layer of the application to be handled correctly. This can be done in conjunction with a determination of environmental condition parameters for the spattering material drying or curing, such as temperature of the air and/or of the target surface (e.g. measured by an infrared sensor), wind speed and/or humidity. Additional sensors can be comprised spattering device to measure e.g. the viscosity, consistence, and/or flow rate of the spattering material. For that purpose, corresponding measuring sensors can be comprised in the device or placed in the environment of the spattering tool and the target surface which then transfers the measured parameters to the tool control.

According to the present invention, one or more 3D imaging spatial referencing units are used, which directly or indirectly geometrically reference the spattering device against the target surface according to visual features, in particular according to reference objects, reference points or reference marks. The spatial referencing units are stationed at a location external of the spattering device, for determining the position and orientation of the spattering device and/or the target surface. The determined position and orientation information is communicated to the computation means that controls the spattering device by wire or by wireless means.

The spatial referencing unit according to the invention comprises at least two optical cameras. According to the image information gathered by the cameras, the spatial referencing unit extracts 3D information by means of digital image processing. For this purpose, the camera image can comprise spectral information, but also monochromatic cameras (e.g. infrared or black & white cameras) can be used for this purpose.

By the digital image processing, the position and orientation of the spattering device in space can be evaluated. Therefore, the spattering device can be equipped with visual features, such as markers or labels to improve the evaluability of the position and orientation, in particular to improve accuracy and/or unambiguousness of the evaluated position and orientation. The visual features attached to the spattering device can be passive (like geometrical objects of a known shape, textures, stickers, etc.) or active (e.g. light sources such as LEDs or lasers which emit modulated or continuous light). The term "visual" in this case means visual for the cameras, and not necessarily for the human eye. For example, an infrared light source which is emitting short pulses of IR-light can also be a visible feature in the present sense, if the cameras used are also sensitive in the IR-range.

Furthermore, optical features, such as markers or labels can also be applied to the target surface. For example adhesive labels or other sticky-markers can be applied to the target surface to provide an easily detectable reference in the images from the optical cameras, especially if the target object itself does not provide uniquely identifiable features by its nature, e.g. in case of a smooth, uniquely coloured target surface. Such natural optical features can be faces of high contrast, edges, corners, textures, seams, joints, screws, bolts, etc.

The optical features can also be applied to the target by an optical projection of light-marks. As the marks must provide a reference relative to the target, the projection must also be established from a fixed position with respects to the target, e.g. from an object or part of the target which is rigidly positioned relative to the target surface. This is not a structured light approach which is based 3D measurement where a known (preferably variable) light pattern is projected onto the target surface from a position which is fixed to a single evaluating camera. It is also not a gathering of 3D-information by light section technology where a triangulation of an intersection line of a target with a light plane is done by a single camera.

In the present invention, the projection of optical features can for example be established by a dot-matrix projection by a projection source located at an arm which is fixed onto the object that comprises the target surface to be spattered. Beside tripods, screws or clamps, such a fixing of the projection means can also be established by a magnetic-base-holder, by suction cups or by adhesive means. Thereby, the optical features for referencing do not hinder an application of the spatterwork, as the location of the marker is—in contrast to sticky-markers, which are also usable according to the invention—still spatterable.

A known geometrical shape of the target surface (e.g. provided as a CAD-Model of the target) can be matched into the information determined by the 3D imaging system. This can be used to accurately evaluate sections of the target surface which otherwise might not be uniquely determinable by the 3D imaging systems, e.g. overlaps, concave sections, steep step-features, etc. Also, an absolute position of the spattering data on the target can evaluated according to a matched CAD-model. Such absolute coordinates can refer to an independently defined global, regional or local coordinate system or to one being related to the target surface, e.g. for an object of accurately known geometrical shape, such as a manufactured product like a car body, or a new building whose walls have to be painted.

By the usage of at least two cameras, epipolar geometry (as the geometry of stereo vision) or triangulation can be applied. When two cameras view a common 3D scene from two distinct positions as stereobasis, there are a number of geometric relations between the 3D points and their projections in the 2D image plane captured by the cameras that can be expressed as constraints between the images of the features.

The constraints resulting from those relations can be expressed mathematically. For illustration purpose, a simple embodiment can be described based on the assumption that the cameras are approximated by the pinhole camera model. For practical implementations there are much more sophisticated methods known, which can involve alignment uncertainties of the cameras, optical distortions, etc. Each camera captures a 2D image of the 3D scenery which has to be evaluated. The thereby resulting conversion from 3D to 2D can be referred to as a perspective projection. In a pinhole camera model it is common to model this projection operation by rays that emanate from the camera and passing through a centre of projection, wherein each emanating ray corresponds to a single point in the image.

For associating a point of an object unambiguously to the according pixels in each of the two 2D images, some visible features (like marks, patterns, contrast faces, etc.) have to be present in the image. Thereby the same visible features which are present in multiple images taken from different points of view can be identified and matched. Such an identification and matching is a well known task in the art of digital image processing. Thereby the picture coordinates of the visible features in the images can be determined in pixels, and preferably also in sub-pixels, of the image. According to those coordinates and the geometrical constrains between the images which result from the stereobasis and different viewing angles, can be used to gather three dimensional information.

In one embodiment, the location of the at least two observing 2D cameras can be chosen by providing them fixed to a common base with fixed and predefined position and orientation relative to each other, also known as given stereobasis.

In another embodiment, location of the at least two observing 2D cameras can be chosen freely in each setup, e.g. by providing each of the camera on it's own tripod, which can located and arranged according to the possibilities given by the periphery. Nevertheless, the locations, which gives the stereobasis of the setup has to be known during measurement. The cameras can be located at fixed positions relative to each other during measurement, or if one or more cameras are movable, their actual positions have to be determinable by some measurement means. To gain knowledge of the arrangement of the cameras, a calibration by a known object or image in the field of view of the cameras can be executed. By the calibration, the relative alignment of the fields of view of the cameras to each other can be determined by image processing. Alternatively, the camera setup can be surveyed and the surveying data is then provided to the spatial referencing system as stereobasis.

To overcome possible geometrical image distortions of the camera and/or its optics, there are camera calibration methods known. Thereby a transformation of object-points to image points can be calibrated to fit the model used for gathering 3D information.

The fields of view of the different cameras have to at least partly overlap, at least in the region of interest which has to be evaluated.

By the usage of more than two cameras, the accuracy and uniqueness of the determined 3D information can be improved when the data from more than two cameras is combined. A combination can for example be established by a permutation of the images from multiple cameras which are evaluated together or by a combination of the multiple 3D results from different camera pairs. Also, an evaluation of all of the images together to achieve a single 3D result can be done. Methods of statistics, e.g. a least square fit or a validity-voting, can be applied on multiple 3D measurements using redundancies for improving accuracy.

Also, multiple pairs of cameras from different points of view can be used and their 3D results can be combined. This can for example be helpful in case of an obstruction of on of the fields of view, in which case the other cameras are still capable of gathering 3D information.

In addition, the appearing size of a known geometry in a camera picture can be used as a source of 3D information, as it also allows a calculation of distance and orientation information, in particular if the shape of the known geometry is chosen in such a way, that it results in unique 2D views from different viewing angles.

The position and orientation information is communicated to the computation means which commands controls to the nozzle control mechanism. The communication is preferably done in Realtime or by the usage of a distributed clock system, for example in such a way the position and orientation values have unique timestamps.

Additional sensors for supporting the determination of a global position of the spattering device relative to the target surface can be used. For example a GPS for positioning outdoors in two or three dimensions (or also the direction when using two antennas or even attitude when using 3+ antennas). In large scale spattering applications, such a GPS can provide absolute geographical reference wherein a spatial referencing unit according to the invention is used for referencing the spattering device to the target with sufficient accuracy. Although the usage of some known GPS-accuracy enhancements like DGPS or RTK-Stations can further increase the performance and accuracy (e.g. to a cm level), such is still not accurate and certain enough for a graphical application system according to the present invention, which in general requires greater accuracy than achievable by GPS. A highly accurate GPS system is also too slow to handle the dynamics of the spattering device.

Also, an electronic distance measurement (EDM) device or laser rangefinder can determine the distance to the target surface to adapt expelling characteristics accordingly. By the usage of multiple EDM or deflecting its measurement beam, it is not only possible to determine the distance but also the inclination relative to the target surface.

The spattering device can also comprise an additional inertial measuring unit (IMU) which can determine at least a subset of position, speed, acceleration and attitude in 3D-space. This can for example be used in case of a temporary obstruction of a cameras view, for example by the operator. In which case the IMU or the rangefinder can take over to avoid malfunction until the spatial referencing unit is operational again.

Furthermore, a plurality of different combinations of the above mentioned additional sensors can be used, such as e.g. a multiple camera based spatial referencing unit plus an IMU, a multiple camera based spatial referencing unit plus a GPS for outdoor applications, or a multiple camera based spatial referencing unit plus an ultrasound or laser based electronic distance measurement unit to determine the distance to the target, etc.

Another addition can be the usage of one or more further cameras which are located at the spattering device and directed towards the target surface for determining properties of the target surface. A camera at the spattering device can e.g. be used to determine interruptions on the target, determine areas already painted or checking the results as painted. Also, additional triangulation based distance and/or attitude measurements from the device to the target can be executed to achieve an additional local referencing, for example based on the device's camera image or in combination with a structured light projection of some illumination pattern onto the target surface whose shape and/or scale will be distorted dependent on the distance or attitude. The global referencing according to the invention is always done by camera based spatial referencing unit.

In addition to local spatial referencing, also speed and/or accelerations of the nozzle means can be evaluated and incorporated in the controlling process.

In a handheld embodiment of the spattering device, a feedback control can be based on context based parameters such as the current position, attitude and user dynamics, which can be used for correction and prediction of the position and declination, path-planning, and environmental parameters. The path-planning can be based on the desired spattering data which comprises information about the desired pattern of paint or powder on the target. The computation unit can—based on the desired spattering data—determine an optimized path and procedure for the present spattering task, which can be used for guiding the operator to generate the desired pattern on the surface. The planning can also help to apply multiple layers of paint subsequently. Thereby the aspects and parameters relating to the surface condition or paint type such as colour, viscosity, kind, drying/curing time, etc. can be included in the optimisation process as well.

A planning tool can support the operator in preparing and simulating the spattering procedure. The planning can be executed on a remote Computer or be comprised within the spattering system itself if it comprises an according input and output means for user-interaction. The planning can be done in advance of the work based on already available digital data, such as a 3D model or CAD data, or by a surface model information gathered by the spatial referencing unit One embodiment of a workflow in case of an unknown target can for example comprise a first scanning of the target, a second planning which might comprise graphical simulations and a third execution of the spattering task. The planning can also be done online and interactively during the actual spattering process, which in particular allows reacting to unforeseen obstructions or uncertainties of the target surface to be able to either react automatically or to inform the user of possible problems. The planning can also include information regarding sudden or unexpected interruptions on the surface.

As described above, the nozzle can be moved by a positioning unit within the spattering device. In such an embodiment, only the body of the spattering device in which the nozzle moves has to be spatially referenced. Thereby, in general the body is kept to a single location on the target surface until its range at this location is spatter. Then the spattering device is transferred to the next location, where it is again spatially referenced and the thereby determined displacement and/or rotation is used by the computation means to continue the spattering of the desired spattering data. In such an embodiment the spatial referencing unit is not confronted with high dynamics of movement and the not even real time communication of the determined position and orientation is required.

In contrast thereto, to guide the operator on a desired and/or optimized path in a handheld embodiment or when the spatial referencing is directly referencing the nozzle means and not the spattering device's body, high measurement dynamics and probably real time position and orientation communication has to be established.

In a handheld embodiment, the spattering device can be equipped with some simple symbol lamps for indicating the desired direction of movement to the operator. The desired movement can also be indicated by symbols on a display. To guide the operator, for example also the present deviation from the desired path can be indicated to ease keeping the spattering device inside a range of the desired spattering area in which the device is capable of automatically correcting or compensating the deviations.

It is also an option to overlay the desired spattering data, e.g. the CAD-data or picture with the reality. This can be done on a display by overlaying an image of the real world, captured by a camera with the desired data and/or instructions to the operator. Another option is to project symbols or parts of the CAD data or image directly onto the surface to be painted, at least around the current working area. Yet another option is to indicate the desired movement by acoustic signals like beeps or voice instructions as well as by haptic means.

A common task is also the repair of painted surfaces. Repairing means spraying paint of the same type onto a wall, ground, ceiling or an object which had been previously spattered, but its paint has faded, vanished or was demolished by some accident, vandalism or repair work.

The type or colour of the paint can be real-time determined from a reference section of the target during work. This requires sensors determining at least the colour, if possible also the type or even the thickness of the paint on the target. For example, this can be done by a calibrated CCD/CMOS camera for colour or by paintmeters for sheet metal paint thickness determination, as they are known in the art.

To determine the colour it can also be advantageous to illuminate the target by a light source which covers a broad spectral range, which is also advantageous for the operator to oversee his work, even when no camera or automatic colour determination is used. In case of a damaged or different paint, e.g. to mend scratches or graffiti, those disorders can be detected and also the previous colour can be determined (or specified by the operator, a CAD-system or database).

The determined colour can then be mixed and loaded or mixed online by the spattering device. The correct colour will then be applied to the area to be overpainted or repaired, which area can e.g. also be determined by a sensor like an optical camera. To determine the area which needs to be repaired it is also possible to determine the thickness of the present spattering to decide whether new or additional spattering material has to be applied to the surface.

When the spattering device is equipped with a dedicated nozzle for sandblasting, the scratched area can e.g. also be prepared, cleaned and "sandpapered" in advance of applying new spattering to the scratched area, by one single spattering device.

The nozzle of the spattering device can also be moved over the target area or surface by using some kind of mechanical support unit, like a robot arm or guide-rails. Such a system can be embodies like a portable x-y-plotter or an inkjet-printer-like device with a nozzle means that is movable by a motor within a frame or body of the spattering device. For mechanical support, there can be guide rails, arms or string guides which are equipped with means for the determination of the nozzles position within the spattering device. There can be guide rails which can be fitted to uneven free-form targets, e.g. as in the above referenced prior art. The support unit can also be built to ensure a certain nozzle-target distance, or this distance can be adjustable by some automatic means.

In a handheld embodiment of the spattering device, above mentioned supports can e.g. also comprise a compensation of the gravity of the spattering device, allowing a manual surface spattering which requires almost zero force from the operator, whereby time consuming spattering tasks can be executed with reduced tiring of the worker.

When using such mechanical supports, position and attitude can partly or fully be determined by sensors comprised in the spattering device and/or by the support unit or—if present—by a motorization system as well. The spatial referencing unit then handles the position and orientation of the spattering device, in particular its body, relative to the target surface. In other words, according to the invention, also such a guided spattering system is spatially referenced by an external spatial referencing unit which comprises at least two cameras. The spatial referencing of the nozzle means can be established either directly by the spatial referencing device or indirectly via a referencing of the spattering device's body within which the nozzle can be further positioned (and maybe also oriented), preferably by some drive mechanism.

BRIEF DESCRIPTION OF THE FIGURES

The method according to the invention and the devices and setup according to the invention are described or explained in more detail below, purely by way of example, with reference to working examples shown schematically in the drawings. Specifically.

The diagrams of the figures should not be considered as being drawn to scale.

DETAILED DESCRIPTION

Figure 1:
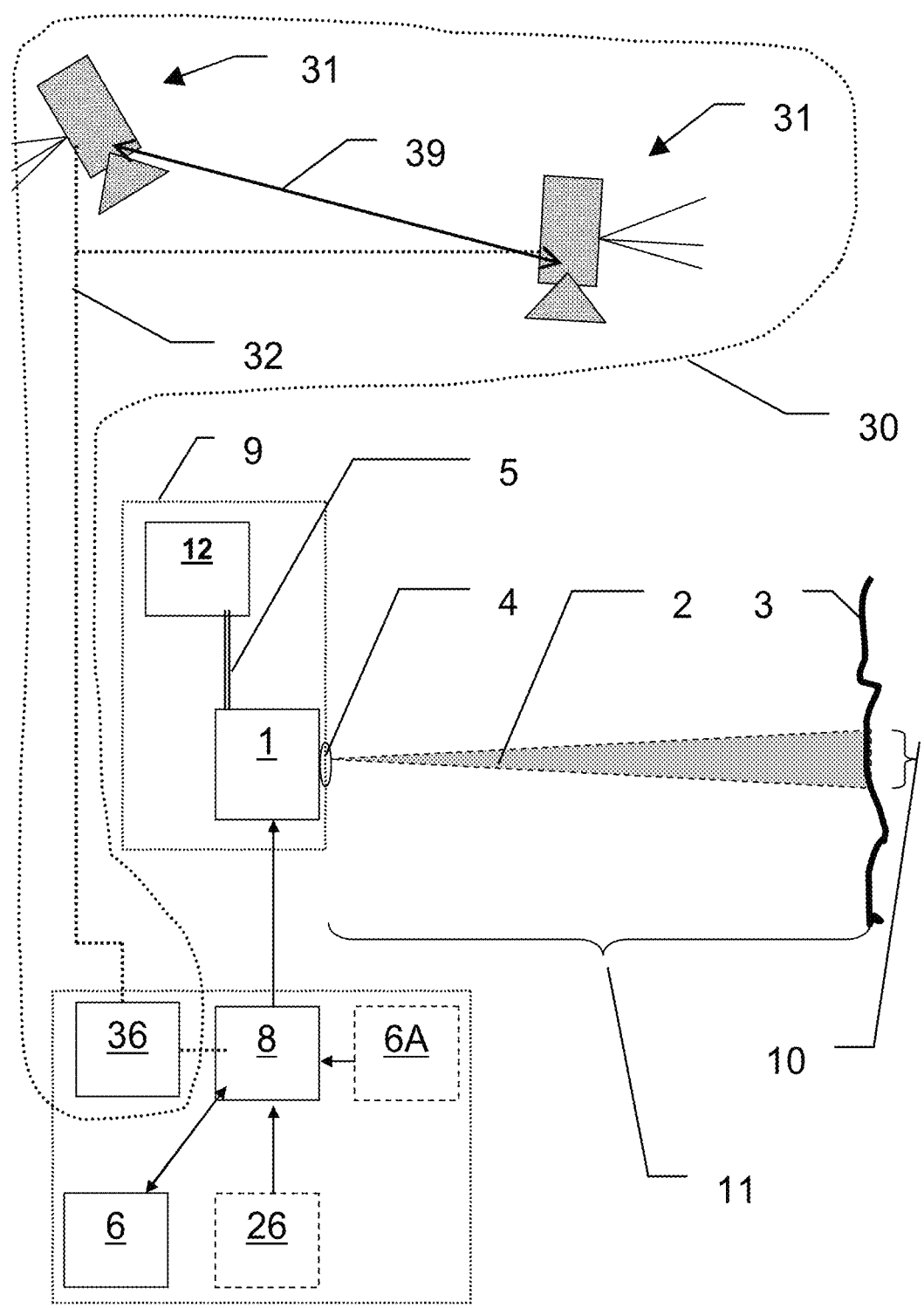
FIG. 1 shows an example of a possible embodiment of a graphical application system according to the invention which comprises a surface spattering device with single nozzle means for expelling a single spattering material and two standalone cameras.

FIG. 1 illustrates an abstracted view of an embodiment of a handheld surface spattering device 9 which comprises the following parts:

A nozzle means 1 which is designed to expel, eject or spray a spattering material 2 onto a target surface 3. The nozzle means 1 comprises a nozzle control mechanism 4 to control expelling characteristics (or characteristics of ejection) of the nozzle means 1.

The expelling characteristics influence the shape and/or direction of the expelled jet of spattering material 2, which can, for example, be defined by parameters like direction, jet-shape, jet-divergence, pressure, speed material rate, emerging speed, aggregate state and/or composition of the expelled spattering material, etc.

The spattering material 2 (the reference sign actually indicates a jet of expelled spattering material) can be of different nature, e.g. liquid, solid, gaseous or of mixtures of those states. Common examples of spattering materials are paint, finish, lacquer, ink and powder, but also concrete, wax, plastics, asbestos, sand and many more can be expelled. The spattering material 2 is supplied to the nozzle means 1 by a spattering material supply 5 which can be embodied as a link to a storage 12, such as a tank or container, which is located at the spattering device 9 or as a pipeline from an external spattering material storage 12.

The target surface 3 can also be embodied by different objects like sheet metals, walls, floors, grounds, ceilings, roads, machinery, car or airplane bodies, boat hulls, clothes, etc. The target surface 3 can also be limited to certain areas of the mentioned objects. The target surface can be of any shape and also comprise edges, corners, concavities, obstacles, etc.

The expelled jet of spattering material 2 which is directed to the target surface 3 results in spots of spattering material 2 on the target surface 3. The spot can be characterized by its shape and spot size 10 on the target surface 3 which is dependent on the characteristics of the expelling and the distance 11 between the nozzle means 1 and the target surface 3, as well as on the inclination of the expelling direction relative to the target surface 3.

The nozzle control mechanism 4 to control the expelling characteristics of ejection of the nozzle means 1 resulting in different expelling characteristics can vary from a simple on/off switching of the expelling to a control of a multiple of the mentioned expelling characteristics by mechanical and/or aerodynamical means which can, for example, be adjusted by motors and/or valves, in particular micro-motors and/or micro-valves. As the expelling can also be initiated by piezo-electric, thermal or other effects, these can also be influenced by the nozzle control means, as well as for example the pressure or flow rate of the spattering material supply 5.

The computation means 8 controls or regulates the nozzle control mechanism 4. It can be embodied as a micro-controller, an embedded system, a personal computer or also in form of distributed system where the actual hand held spattering device comprises only a basic computational unit which can establish a communication link to another computation means which can for example have more capacity and performance than the one inside of the handled device, such as a personal computer, laptop or workstation. The communication link can be established by wired or wireless means.

The computation means 8 comprises or is connected to at least one storage which can be embodied as a RAM, ROM, hard disk, memory-card, USB-Stick, or the like, which can be either fixed or removable or a combination of both.

The storage is built in such a way to memorize the desired spattering data 6, which can be a CAD drawing, vector graphics, a bitmap picture (compressed or uncompressed) and also might even comprise tree dimensional information. In case of a contorted, curved or uneven target surface 3 which needs to be spattered, the spattering data can—beside a two dimensional artwork information—also comprise further information on the three dimensional fitting of the artwork onto the surface.

Another embodiment which comprises desired spattering data in 3D can build up a three dimensional spattering, in particular by multiple layers of spattering material 2, wherein the previous spattering can be seen as a new target surface 3 for the current spattering, in particular wherein the spattering is applied in multiple layers of spattering material 2. The spattering device 9 can be moved in more than three dimensions, which can bring advantage over the known 3D-printers or stereo lithography devices which are based in three orthogonal axes. Therefore, the layers are not restricted to parallel and equidistant slices as in conventional 3D printing, but the layers can be applied from various directions. Therein the actual target surface of each spattering process can be inclined to the previous one. This can for example improve mechanical strength of the 3D object built up by the surface spattering device, as the layers can be shaped in direction of the mechanical stress which will be applied to the object when in use, or in other words the orientation of the spattering material layers can be arbitrary shaped and curved in such a way to achieve maximum strength in view of the expected load distribution when the spattered object will be in use. So to say, the spattered layers can follow the tension lines, which is not the case in state of the art Cartesian 3D printing.

For example, a free movement in space of the spattering device 9 can allow applying spattering material 2 from different angles or even from underneath or through wholes which are not accessible by a three axis 3D printing system, wherein complex structures can be built up with a reduced need for supporting webs or bridges which afterwards have to be removed to result in the final 3D product. The application of three dimensional structures as desired spattering data can in particular make use of the mentioned methods for curing the spattering material 2.

The user can be directionally guided in moving the device as discussed above to allow a handheld 3D spattering of highly complex structures from almost any side and angle of the object. For example an erected structure can be built up by spattering approximately from the top, whereas a sideways extension can be applied by spattering approximately from the respective side. Obviously, the direction of spattering does not necessarily has to be perpendicular to the direction of the structural part to be applied by spattering but can also be inclined to a certain extent. Limiting factors are a shadowing of the target surface to be spattered or such a flat spattering angle that the spattering material will not stick on the surface, which both obviously have to be avoided. Due to the handheld movement of the spattering device, above mentioned conditions are easily achievable, in particular by a automated user guidance, hinting the operator on preferred movement strokes which his hand should execute—at least approximate movements, since the nozzle control can take care of possible fine adjustments of the expelling. Also, a display of the desired object from the operator's point of view or an augmented reality display can be used as guidance aid.

The term target surface in this embodiment can be a surface of an already created part, sub-part or cross-section of the desired 3D object on which a further building up is required. The orientation of such a surface is not limited to parallel planar slices, as in common rapid prototyping systems, but can vary during the spattering process by pointing the spattering device from certain direction, in particular in a direction being approximately at right angles to the surface. The three dimensional desired spattering data can also comprise different spattering materials information, for example a body consisting of one material and a surface-finish consisting of a second material, both applied by the same spattering device.

In prior art handheld spattering devices were only capable of applying flat 2D coatings, mostly desired to provide an even and smooth, uniform coating of the target surface. The present spattering device can go beyond this, enabling not only a handheld application of desired two dimensional material distributions such a flat images, but also real three dimensional desired spattering patterns in form of reliefs or three dimensional objects.

Therein, not only the spattering device's position and orientation in space can be used as a basis for calculating the portions of the desired 3D spattering data still to be applied, but also the target object and the already applied parts of the desired spattering data can be observed, scanned or measured for determining the to be applied portion of the desired data and a preferred range of position and orientation of the device from which the application can be executed. Thereby the user can be guided to hold the spattering device in this preferred range of spatial coordinates and orientation for applying a certain portion of the 3D pattern. By an embodiment with a handheld approach, there is much more flexibility given than by the known, rigid, portal-based 3D-printers, while avoiding the costs of a complex robot arm guidance for enabling the same range of position and orientation flexibility as achievable by a lightweight handheld device as presented herein. The handheld concept also solves the problem of on sight construction or repair of 3D parts, which would often be advantageous but not possible with the big, inflexible and rigid prior art machinery for 3D printing tasks.

For example, ship-hulls, vehicle bodies, casings or parts of those can be spattered out of spattering material, e.g. fibre-compounds, thermoplastics, thermoset, sintering powder, or other spattering materials mentioned above, without the requirement of having a positive or negative mould, but just by hand-out of digital three dimensional spattering pattern data of the desired object supplied to the device from some storage means. The described curing unit for the spattering material can enable a rapid application of a next layer of material onto the previous one by immediately curing the spattering material after its application.

A device according to this aspect could also be called a handheld 3D printing unit, which comprises a controlled nozzle means 1 for expelling material 2, a spatial referencing unit and a computation unit 8, with storage for the desired 3D spattering data 6, for controlling the nozzle means 1 according to the spatial reference and the desired spattering data 6. The device can further comprise a user guidance means for virtual spatial guidance of a user's hand which is holding the device 9.

The computation means 8 can also comprise or be connected to one or more human interfaces 26 like a display, screen, projector, touch screen, multi-touch screen, lamp, light, button knob, dial, joystick, speaker, microphone, etc. as well as providing machine interfaces for communication with further technical equipment.

The power for the spattering device 9 can be supplied by a cable or by energy storages such as batteries. The device can further be supplied with compressed air and/or spattering material which can be stored at the device or supplied by a remote means.

The computation means 8 can access spatial information from a spatial referencing unit 30. The spatial referencing can take place in a different number of degrees of freedom (DOF), for example in 3D in space with 5 or 6 DOF. The referencing can take place in a local coordinate system or in a superordinate or global coordinate system, e.g. by global referencing for outdoor applications. Dependent on the present spattering task, it can also be sufficient to reference less degrees of freedom, in particular if the spattering device 9 is guided in parallel to or on the target surface 3 to be painted or if the target distance 11 is determined by a support or by an additional distance measurement unit.

The achievable range and the required resolution of the spatial referencing unit 30 depends on the application which the actual spattering device 9 is designed for. This desired range can vary from indoor, local, small area positioning with the expansion of some meters to outdoor, regional or global areas with an expansion of some tens or hundreds of meters for bigger paint projects like sports-grounds or road markings.

The spatial referencing unit 30 for determining the position and orientation (or pose) according to the invention comprises multiple two dimensional image sensors 31 (also known as photographic or video cameras), in particular CMOS or CCD sensor arrays for detecting optical radiation.

The spatial referencing is achieved by one or more camera(s) 31 for orientation and position determination. Such systems are also referred to as vision based tracking systems or stereoscopic systems. The cameras 31 are arranged with a stereobasis 39 relative to each other, which means that they are located apart from each other, resulting in different views of the scenery of interest. The images of the cameras 31 are capturing at least partially the same scenery, but seen from different locations. Based on the stereobasis 39 there are geometrical constraints, which allow to gather 3D information from the multiple images. Therein the same visible feature in each of the image is identified and its respective coordinate within each of the images is determined (for example in picture- or image-coordinates of pixels and preferably subpixels). Such tasks are nowadays quite common in digital image processing and there is a collection of software libraries available to achieve such, or even libraries for the complete 3D imaging from multiple camera views. As the images differ, the same visible feature will likely have different picture coordinates and according to the stereobasis 39, three dimensional information of the visible feature can be calculated. The stereobasis 39 is either known by the construction of the spatial referencing unit 30, in particular if their setup is fixed, or can be surveyed or can be calibrated by known reference geometry, in particular if the setup comprises standalone cameras 31 which can be located independently while setting up the spatial referencing unit. The spatial referencing 30 unit with its at least two cameras 31 can therefore be embodied as a single device, as multiple devices which each comprises at least one camera 31, or of a set of cameras 31 and a evaluation means 36 that is doing the image processing. The image processing can also be done on a remote computation means, for example on the same computation means 8 as used to control the nozzle means.

The visible features 33 are built in such a way, that they can be identified in the images from the cameras 31, (not necessarily for the human eye). For example, they can provide contrast faces and/or a known shape or geometry for making them identifiable in the image. The visible features 33 can be naturally occurring features which are visible and identifiable in the image, for example textures, edges, differently coloured sections, etc. They can also be embodied by artificially applied visual features 33 such as makers attached by means of sticking, magnets, adhesion, suction cups, glue, screws, bolts, clamps, etc.

The visible features 33 can for example also be light points for example active in form of optical emitters such as light bulbs, LEDs, lasers, fluorescent material, etc which are emitting continuous or pulsed light. As a single visual feature 33, in particular of unknown shape and size, is in general not sufficient to determine a spatial reference in five or six degrees of freedom a set of multiple visible features is used for referencing by the cameras 31.

An embodiment of a spattering device 9 can for a example be equipped with an arrangement of multiple LEDs as active visible features 33, wherein the arrangement is built in such a way that its position and orientation can be determined uniquely, for example assisted by blinking codes, different colours, etc. Also, an arrangement of passive visual features 33 like on or more geometrical objects of well defined shape and/or colour can be used as visual features. They can also comprise fluorescent or retro reflective surfaces.

An additional set of visible features 33 can also be present on the target surface 3, in particular when the surface itself does not provides such features, e.g. a uniformly coloured, smooth surface. They can be embodied by stickers, preferably of known shape, colour or texture. It is not necessary to know their shape in advance, if they are identifiable in the images. I the shape and/or size of a feature is known, its appearing size and/or shape in the image can be used for determining further information regarding its distance and/or angel with respect to the camera 31. The visible features 33 can alternatively also be attached by magnets, clamps, screws or other means. An alternative are also projected light markers, which are projected from the target surface 3 or an object rigidly fixed to it, as their position with respect to the target surface has to be fixes. Such light markers as visible features can be simply over-spattered by the spattering device 9, which might not be possible when sticky markers are used.

There can be a first set of visual features 33 at the spattering device and a second set of visual features 33 at the target surface, whereby the spatial referencing unit 9 with its at least two cameras 31, which is situated remote of the spattering device 9 can reference the spattering device 9 and the target surface 3 relative to each other.

One possible additional option for outdoor applications is a GPS system, which can optionally be aided by an additional sensor 6A like an IMU, a digital compass and/or an inclinometer. Another additional option is an IMU only, which can also optionally be aided by a digital compass and inclinometer.

As the spatial referencing unit 30 is located remote from the spattering device 9, a communication link 32 from the remote spatial referencing unit 30 to the computation means 8 which handles the nozzle control mechanism 4 has to be established. Preferably, a real-time communication is used, which allows handling high dynamic movements, in particular in case of a hand guidance of the spattering device 9.

Optionally, potentially occurring delays can—at least partially—be compensated by a prediction or a look-ahead, in which case e.g. additional information gathered from an IMU can also be helpful.

A spattering device 9 can also comprise additional sensor means 6A like rangefinder(s) or distance meter(s) based on radar, ultrasound, light, laser or radio waves which can be used for determining the distance to the target surface or—when using multiple rangefinders can also be used to determine a relative tilt with respect to the target surface. The distance-to-surface sensors 6A can be used for both 2D and/or 3D if arranged accordingly.

The nozzle 1 of the spattering device 9 can also be attached to an articulated arm, a Cartesian guide or another means within the spattering device, that allow to determine the position the spatial measurements of the nozzles position and/or it's orientation within a body of the spattering device 9. The spatial referencing unit 30 is then used to determine the position and orientation of the spattering devices body according to the invention, and thereby indirectly also the nozzle 1.

An embodiment can comprise a passive (which means non-motorized) or active (which means motorized) articulated arm, to which the surface spattering device 9 can be attached. For achieving a positioning of the surface spattering device 9 relative to the target surface 3, the spatial referencing unit 30 is used to reference the arms base relative to the target surface 3 which—together with the articulated arms measurements—allows the calculation of the relative spatial information between the nozzle means 1 and the target surface 3 which information can be comprised in controlling the characteristics of the expelling of the nozzle means 1. If a digital 3D model of the target surface 3 exists, it is for example also possible to define the target surface 3 by spatially measuring characteristic points of the real world embodiment and matching them to the corresponding 3D model and thereby referencing one or more target surfaces 3 relative to its CAD model.

The embodiment of FIG. 1 illustrates a spattering device 9 for expelling a singe spattering material 2 or mono colour paint, which is supplied as a pre-mixed spattering material 2 of the desired colour, viscosity, etc. from a spattering material storage 12.

Figure 2:
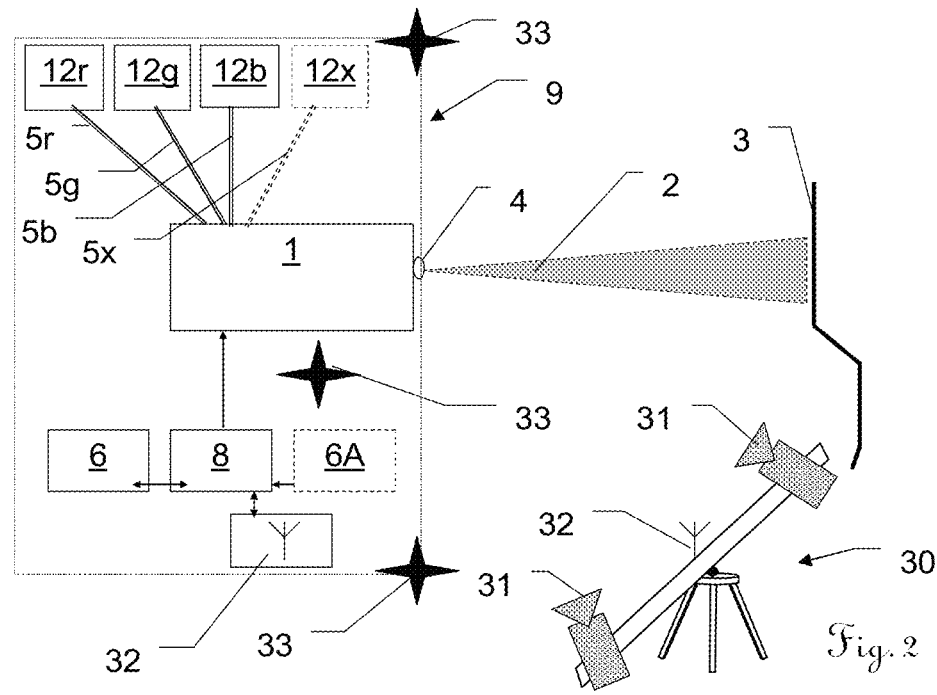
FIG. 2 shows an example of a possible embodiment of a graphical application system according to the invention with a spattering device with a single nozzle means for ejecting multiple spattering materials or mixtures of those spattering materials and a stereographic camera setup.

FIG. 2 shows another abstracted view of an embodiment of graphical application system according to the invention. The nozzle means 1 in this figure comprises a mixing of multiple spattering materials 2 inside of the spattering device 9. In the illustrated example, there are three spattering material supplies 5r, 5g, 5b representing red, green and blue paint-materials supplied from the corresponding storages 12r, 12g, 12b. The different spattering materials can then be mixed inside of the nozzle means 1 to a desired composition, being controlled by the nozzle control mechanism 4, for example to achieve the desired colour, which will then be expelled by the nozzle means.

The dosage of each of the supplied colours can for example be achieved by valves, pumps with variable rate of delivery, or other known means. If required, some additional stirring up can be done to achieve a homogenous mixture. By mixing the different spattering materials from the supplies 12r, 12g, 12b, the spattering device 9 is capable of expelling a range of colours and also colour transitions automatically.

When referring to the term colour in this application, also other a mixtures of spattering materials can be meant which do not necessarily result in a change of colour, like e.g. a mixing with a curing agent, solvent or other additives.

There is also a further storage 12x with the supply 5x (drawn in dotted lines), which can for example comprise solvent which can be mixed to adjust the viscosity of the paint. In another example, the supply 5x can supply a clear varnish, a special colour which is not achievable by mixing (like black, white, gold, silver, etc.) or other additives to the spattering material, for example to achieve metallic effects, hammered finish, or the like. In other embodiments, the supply 5x can comprise substances to influence the curing or other characteristics of the spattering material 2.

The target surface 3 in this illustration comprises a step configuration that can be automatically handled by the nozzle control mechanism 4, which is capable of adjusting the expelling characteristics of the nozzle means 1 to achieve the desired spot diameter on the target surface 3 regardless of the change in distance and inclination introduced by the step. Besides a fully automated adjusting of expelling characteristics, the operator can also be guided or assisted to handle the device in such a way to achieve latter.

The spatial referencing unit 30 comprises two cameras 31 at a given stereobasis 39. The communication link 32 is embodied as a wires communication, symbolized by an antenna.

Figure 3:
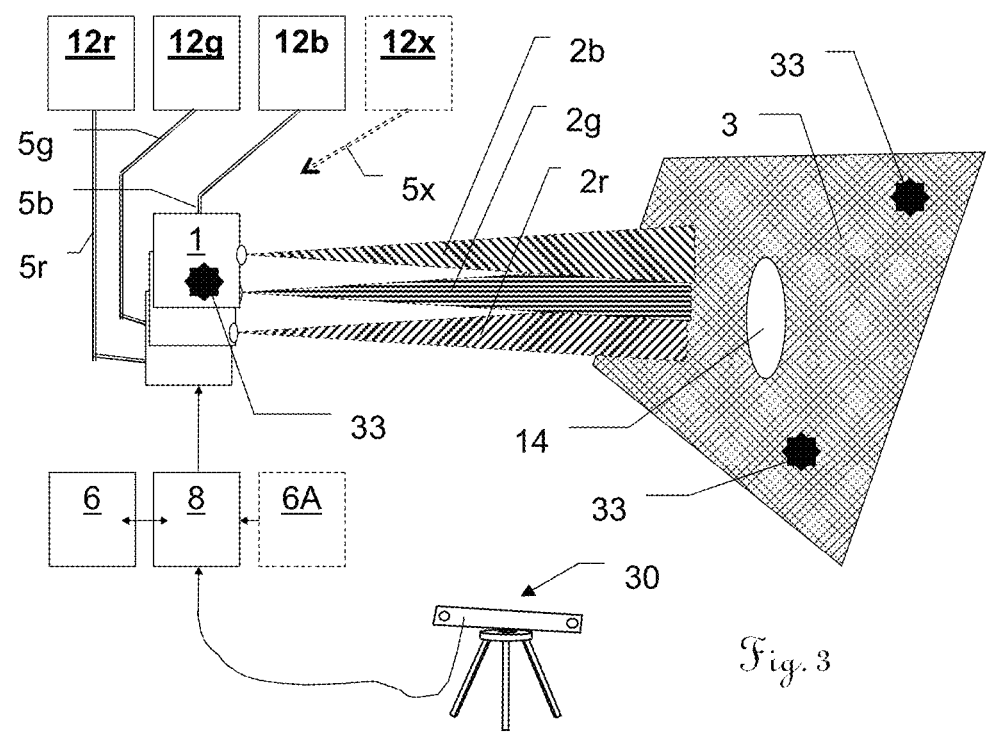
FIG. 3 shows a further example of another embodiment of a graphical application system according to the invention with a multiple nozzle means, each for ejecting a certain spattering material and a 3D imaging unit.

The embodiment of the spattering device 9 shown in FIG. 3 is also capable of spattering the target surface 3 which different mixtures of spattering materials 2r, 2g, 2b. The main difference with respect to the previous figure is that in this embodiment, there is a separate nozzle means 1 for each spattering material supply 5r, 5g, 5b (5x). The actual mixing of the spattering materials 2r, 2b, 2g takes place outside of the nozzle means, either on the way to the target inside the jets of material 2b, 2g, 2r or on the target surface itself by overlapping of the spots of each nozzle on the target surface.

The desired colour effect can also be achieved without an actual mixing of the spattering material, by aligning separate spots of different spattering material close to each other, so they result in the desired colour impression when watched from distance. This method of colour generation is also referred to as dithering in the art of inkjet printing. The number of different spattering material supplies 5 and therefore nozzles 1 is not limited to a certain number, but depends on the desired mixtures of spattering materials 2 which have to be achieved, which can for example comprise the colours red, green, blue, black and white to achieve a wide colour range. Also, other basic sets of colours as e.g. known from the mixing of colour range of the RAL-colour cards or subsets thereof can be used.

Besides a direct mixing of multiple spattering materials, the different nozzles 1 or one single nozzle 1 can also be used subsequently with different spattering materials 2, e.g. to alternatively apply multiple layers of polyester and fibres automatically in a subsequent manner by the same device. By an optional additional sensor means 6A the already applied spattering thickness on the target surface 3 can be determined.

In this example the target surface 3 is inclined relative to the spattering device 9 which, can be detected by the spatial referencing unit 30 and consequently, the nozzle control means 4 can automatically adjust the expelling characteristics of the nozzle means 1 to achieve the desired spattering of the target 3, regardless of the inclination and/or distance and/or to only expel spattering material 2, when the desired result is actually achievable. Therefore, the device 9 can also store information of the already-spattered and/or still-to-spatter areas on the target surface 3.

The desired spattering data 6 can also comprise or acquire information regarding the hole 14 in the target surface 3. This can for example help to avoid a waste of spattering material 2 and also a soiling of the environment behind the hole 14.

Apparently, this principle is also applicable to obstructions, irregularities or singularities on the target surface 3 other than holes 14.

Figure 4:
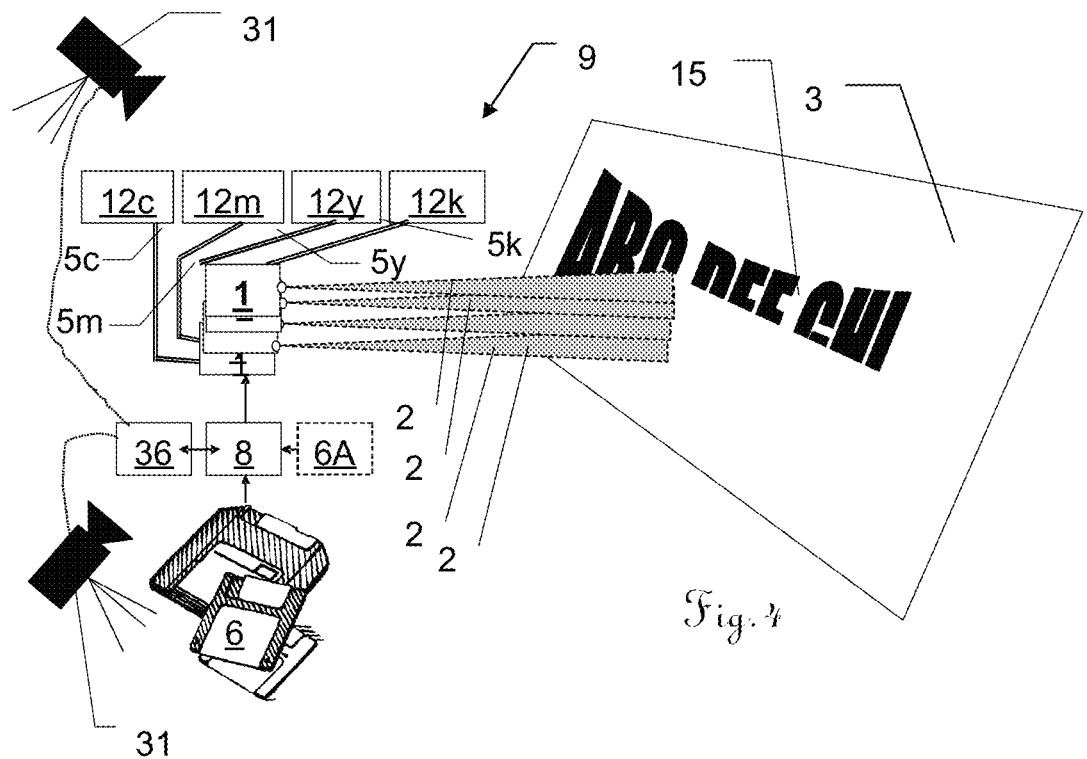
FIG. 4 shows an abstracted view of an embodiment comprising a multiple nozzles means and two cameras applying a desired spattering data onto a target surface according to the invention.

In FIG. 4, there is a similar embodiment of a spattering device 9 as in FIG. 3. This embodiment comprises a four colour CMYK (cyan, magenta, yellow, black) colouring system according to the invention which is capable of applying a multicolour pattern 15 defined by the desired spattering data 6 onto a target surface 3, e.g. a company's logo onto a building's wall or onto a parking lot. This can be achieved without any masking of undesired spattering areas on the target surface 3, whereby productivity of the spattering process can be improved, since the masking process can be very time consuming and its quality has great impact on the overall spatterwork result.

According to the spatial referencing unit 30, the computation means 8 controls the nozzle control mechanism 4 to apply a pattern defined by a desired spattering data 6 onto the target surface 3, by adjusting the expelling characteristics according to the spatial orientation of the spattering device 9 relative to the target surface 3, in particular the relative spatial orientation of each nozzle means 1 to the targeted spot on the target surface 3.

In this embodiment, the nozzle control mechanism 4 can also fine-adjust the direction of expelling or ejection from the nozzle 1, e.g. by tilting the nozzle 1 or by influencing the expelled jet of material 2. Dependent on the spatial orientation and knowledge about the already-spattered and still-to-spatter areas on the target surface 3, the computation means 8 is capable of automatically deciding whether or not to release spattering material 2 to the presently targeted spot on the surface 3 or not. In this case, the presently targeted spot in the expelling direction of the nozzle 1 can also be fine-adjusted by means to deflect the present direction of expelling. The deflection can also compensate the tremor and uncertainties of a hand guiding. Furthermore, the nozzle control mechanism 4 can also be capable of adjusting the expelling divergence and/or the amount of expelled material 2 per time.

In combination with one of the previously mentioned colour-mixing-methods, the graphical application system according to the invention is capable of applying multicolour spattering 15 onto a target surface 3, which can be defined by the desired spattering data 6, e.g. provided as a digital artwork or image stored on a memory card. Such an image can be stored in form of a so called bitmap, comprising a matrix of predefined pixels which are defining spots of spattering material to be applied, and can also include information regarding the desired type or colour of material. The image can alternatively be stored in compressed form or in form of vector information (e.g. as in a CAD-file), text information, etc. which can be converted to a desired distribution of spattering material spots on the target surface by the computation means. The desired spattering data can be described as digital representation of a desired pattern 6 to be spattered onto the target surface 6, comprising information on multiple areas or sections or subsections of the target surface which have to be spattered with different attributes, in particular different colour, spattering material, thickness, surface condition, etc.

Figure 5:
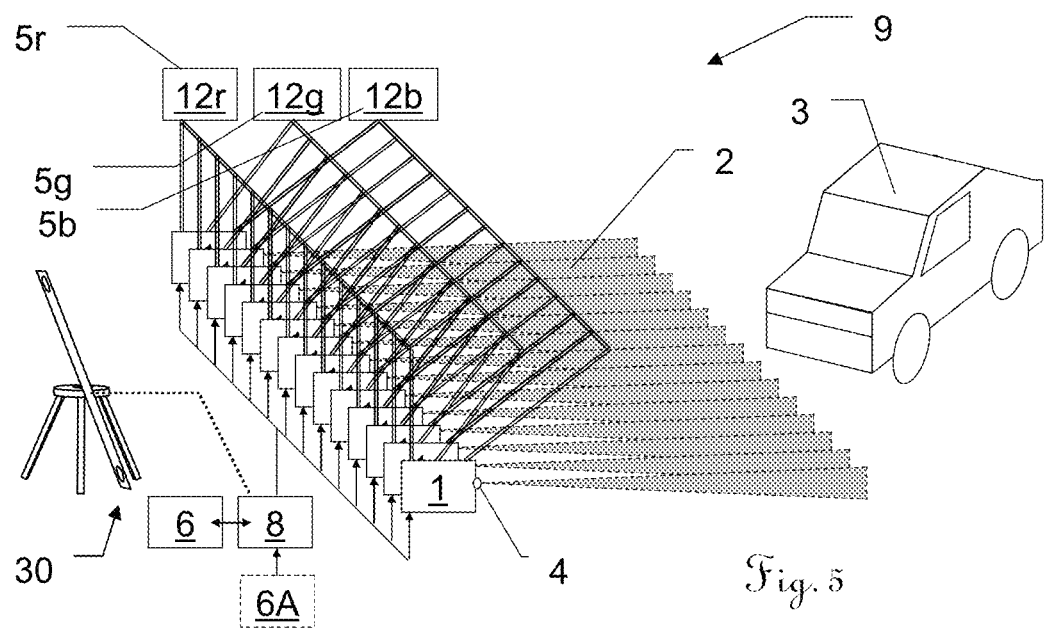
FIG. 5 shows an example of a possible usage of a graphical application system according to the invention with a row of nozzles for spattering the target.

FIG. 5 illustrates another exemplary embodiment of a graphical application system according to the invention, which comprises a row or line of multiple nozzle means 1. The illustration shows nozzles 1 for spattering material 2 mixing as described with respect to FIG. 2, but also the other described mixing methods are applicable in a row-arrangement in an analogous way.

By aligning multiple nozzles 1 in a row or bar or another arrangement, it is possible to at once cover a wide area on the target surface, while keeping the expelling divergence and target-spot-size low. The target surface 3 is represented by a car-body (not drawn to scale). The bar arrangement can also be used to compensate handling inaccuracies by expelling only from those nozzles 1 which are actually targeting a portion of the surface 3 which has to be spattered according to the desired spattering data 6 while deactivating the other nozzles 1.

The spattering or painting can take place during production of the car or also in case of repair or replacement of parts of the car's body. For example, in case of repair, a colour detection system at or external to the spattering device 9 can be used to determine the present and therefore desired colour of the vehicle to be repaired, which information can then be used to adjust the colour mixing system in the spattering device 9 accordingly to achieve the desired colour.

Furthermore, the graphical application system can manually, automatically or semi-automatically detect the desired area to be spattered, by the spatial reference measurements and for the arrangement of the desired spattering data. The desired area can also be provided in a CAD data model or by detecting or teaching naturally present optical features like borderlines, edges or corners of the desired area to be spattered, e.g. by indicating the contours or edges of a polygon surrounding the desired area or by an optical feature such as a laser spot or a marker applied to the target surface 3.

The target surface 3 can also be digitalized by the spatial referencing unit 30 and presented as an image or 3d-model on a screen, on which the desired spattering area and/or desired spattering data 6 can be viewed, selected and adjusted in advance of the actual spattering process, either at the spattering device 9 itself or on a remote computer device. Also, special patterns like logos, etc. can be virtually overlaid on the model or image of the target surface 3 by similar means.

Other examples to determine the desired spattering data 6 are the online or offline measurement of the actual spattering thickness or an examination of the target surface 3 by sensor means e.g. to find colour or thickness differences or the like. The mentioned paint-thickness-sensors are e.g. known and used in the car or sheet metal area for determining the spattering thickness. The spattering device can comprise or interact with paint recognition sensors which are capable of determining colour, visual characteristics, type or state of the paint that was already applied long ago or that has just been applied to the surface. Common examples of such paint recognition sensors 6A are e.g. digital cameras, infrared or ultraviolet cameras or sensors, spectral analyzers, eventually combined with a corresponding illumination system.

Another option is to equip the device 9 with an electronic display or projection means which allows an overlay of the desired spattering data 6 on a screen or the desired spattering data 6 to be projected onto the target surface 3 by a picture or laser-line projector.

Figure 6:
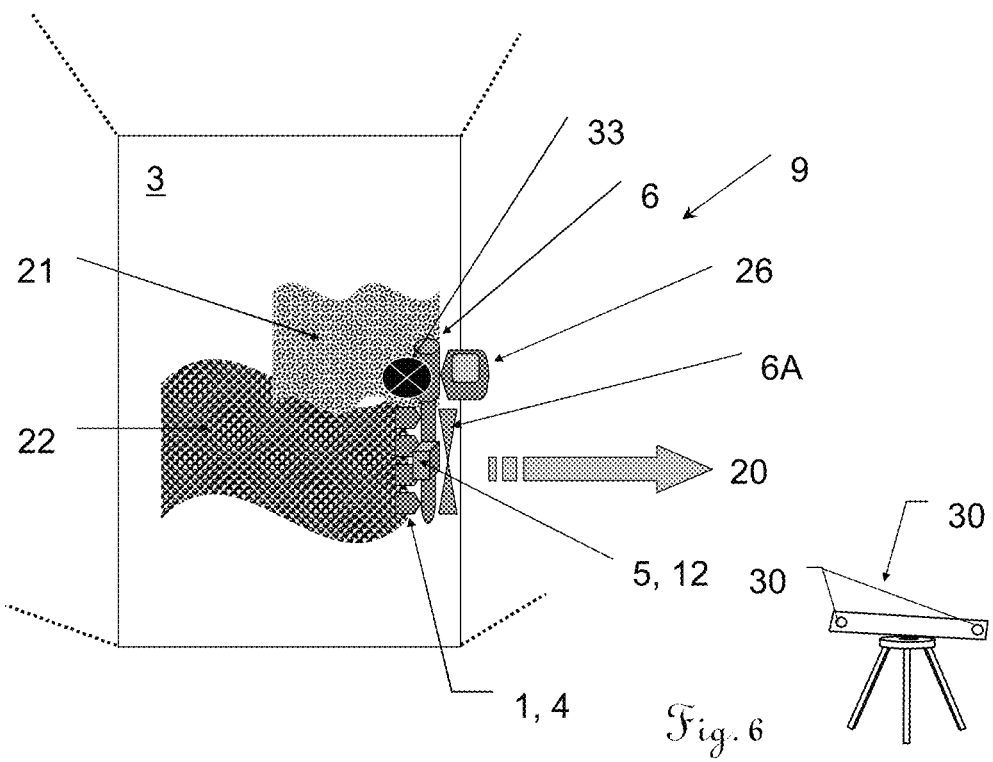
FIG. 6 shows an example for a graphical application system according to the invention with a spattering device comprising additional sensors and control elements.

FIG. 6 shows an embodiment of a graphical application system according to the invention with a handheld spattering device 9 for spattering a target object comprising the target surface 3, where the device is equipped with additional sensor means 6A.

The illustration shows a previous spattering 21 already present on the surface either for quite a long time or from the previous work session. In addition to this old spattering 21, a new spattering 22 needs to be applied to the target surface 3 which can for example be desired to match the colour and surface characteristics of the previous spattering or which can for example be a graphical item to be overlaid on the previous spattering 21. To determine the characteristics of the previous spattering 21, a paint recognition sensor 6A can be comprised in or attached to the device 9. Alternatively, the camera based spatial referencing unit according to the invention can be used to gather information regarding optical characteristics of the target surface 3.

To interact with the device 9, e.g. to select, arrange, modify, manipulate, create or define the desired spattering data 6 which does not only involve a selection of simple spattering parameters like spattering thickness, colour, target surface edges, etc. as required for a flat spray coating of the surface, but comprises rather complicated graphical designs. This embodiment of the spattering device 9 comprises a human-machine interface 26 (HMI) which can, for example, comprise buttons, knobs, joysticks, dials, displays, touch screens, etc. Besides manipulating the desired spattering data 6 locally at the device 9, this task can also be done on a remote computer and then transferred to the device by e.g. a memory card or by a wired or wireless data link, whereby the required manipulation at the spattering device's HMI can be reduced. The HMI 26 can also be used as a direction indication 20 for user guidance as discussed.

The spatial referencing unit 30 is embodied with at least two cameras 31 arranged with a stereobasis. In the images of the cameras 31, visible features are matched and 3D information is gathered based in the images and the geometrical constraints of the stereobasis by an image processing means.

The digital image processing can be done by a 3D imaging unit, comprising an identification means built to identify a visual feature 33 in the images, a measuring means built to determine picture coordinates of the visual feature 33 and a 3D modelling means built to determine position and orientation according to the picture coordinates and geometrical constraints between the picture coordinates. Thereby the determination of the spatial reference can be done in at least five degrees of freedom. The graphical application system comprises a spatial referencing unit 30 which requires the setup of at least one base station with a camera 31 external from the spattering device 9.

The spatial referencing unit 30 from above can optionally be supported by an additional IMU to determine the dynamics of movement, in particular for a hand held device. This information can be combined with the spatial position and orientation measurement of the spatial referencing unit 30.

The nozzles 1 and nozzle control means 4 are also comprised in the shown spattering device 9, in particular this embodiment comprises a plurality of nozzles 1 in a row-arrangement. The illustrated embodiment also comprises one or more spattering material supply(s) 5 and spattering material tank(s) 12. In combination with an energy storage such as a battery and/or a compressed gas tank, this allows the wireless spattering device 9 to be moved freely by hand without any cables and/or supply lines.

Another embodiment of the spattering device 9 can be split into an external station (or kind of backpack for a handheld device), comprising the heavier parts like power-supply and spattering material tank 12 which are linked to a lightweight handheld nozzle-device by cables and pipes for lowering the weight to be moved while spattering. Such an arrangement can comprise a support frame attached to the ground, to the target surface or to the operator's body for supporting the device's weight. Embodiments of such supports in a handheld embodiment can for example be similar to those in the area of smoothly guiding bulky professional film or video cameras.

The spattering device 9 can comprise an indication means for user guidance, which assists the user in following a desired path and/or to guide the spattering device 9 to areas which still need to be spattered. Such guidance can be achieved by optical, acoustic or haptic means. For example, a desired direction indication by LEDs or by symbols on a screen which point to the desired direction. It is also possible to display more advanced, e.g. 3D guidance information and numerical values on an electronic display or to project guiding lines, shapes, symbols or indications directly onto the target surface 3 to be spattered. Also, an acoustic indication by voice commands or beeps can be used. Those indication means can be comprised in the HMI 26 mentioned above.

An embodiment of a graphical application system according to the invention can also comprise or can be linked to further environmental sensors 6A for determining the local environmental conditions such as temperature, wind speed, humidity, time, and other factors influencing the drying conditions of the spattering material. The environmental information gathered by those sensors 6A can be used by the computation means to command the nozzle control mechanism, e.g. in multiple layer painting. Furthermore, there can be sensors 6A for analyzing the spattering material, like determining its viscosity, flow rate, supply stock, etc. Also, the direction of gravity can be taken into account in the determination of desired expelling characteristics.

An embodiment of the spattering device 9 can be pure manually moved by hand or be at least partly supported by means such as guiding rails, trolley stands, wheeled carts, joint-arms. For example a hand cart for marking sports-fields with chalk-lines comprising a spattering device according to the invention which guides the user to hand-drag it along the desired path of the desired markings by an indication means 26, and automatically corrects minor deviation by the nozzle control means. Such a system can for example also be used to accurately apply sports club logos onto grounds or walls by the hand held device 9. This can be done in multi-colour, subsequently for each colour, by loading the spattering device 9 with the desired colour and applying the parts of the logo which require this colour and then loading the next colour. Another option is the use of a spattering device 9 comprising an automatic colour mixing and being capable of applying a multi-colour-spattering onto the target surface 3.

An embodiment of the graphical application system according to the present invention can (in addition to the spatial referencing unit 30) optionally comprise a position, an angle and/or an inertial determination means such as an inertial measurement unit (IMU), Electronic distance meter (EDM), Global positioning system (GPS). It can also comprises additional sensor means 6A for determining target surface 3 properties, in particular spattered and non-spattered areas, present spattering thickness, present surface colour and/or direction of gravity.

An embodiment of the surface spattering device 9 can be built in such a way that the target surface 3 is spattered by one or more colour or material 2, wherein the colour or material 2 can be:
  mixed by dithering or spattering a dot-matrix of spots of spattering material of a basic set of different colours or materials 2 from the spattering material supply 5,
  mixed online, inside or in front of the nozzle means 1 or by overlaying spots of different spattering material 2 on the target surface 3, out of a basic set of different spattering materials 2 or
  mixed offline, with pre-mixed colour or material 2 being supplied from the spattering material supply 5.

Figure 7:
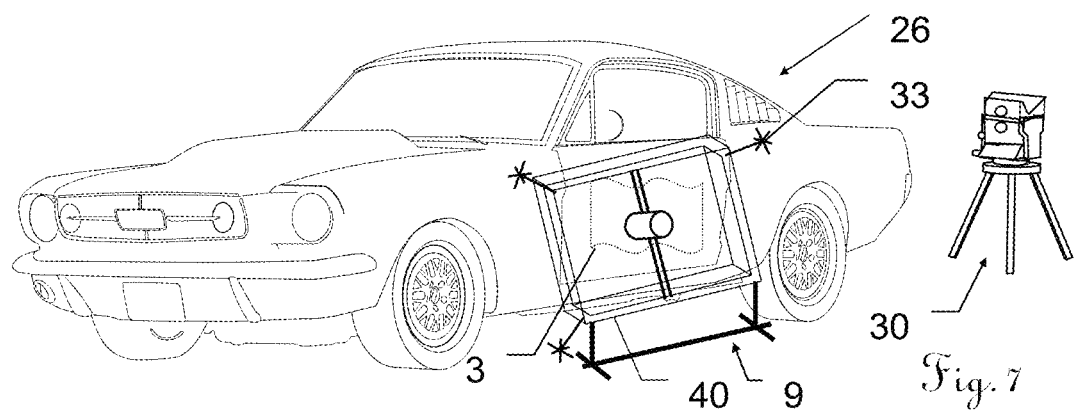
FIG. 7 shows an exemplary embodiment of a graphical application system according to the present invention with a surface spattering device comprising a positioning system for the nozzle means and a stereographic imaging unit.

The embodiment of the graphical application system which is shown in FIG. 7 is used for spattering a logo comprised in the desired spattering data onto a curves surface of a cars 26 door. The surface spattering device 9 comprises a body 40 or frame 40 within which a nozzle means is positionable by a servo-motor. The body 40 is fixed relative to the target surface 3 (in this case to the car). The body comprises a set of visible features 33 arranged in such a way, that its position and orientation is determinable by the spatial referencing unit 30. The spatial referencing unit also evaluates visible features 33 of or at the cars 26 body, whereby a spatial referencing of the spattering device 9 to the target surface is established. The computation means is controlling the positioning of the nozzle means 1 within the spattering device 9 and also its expelling based on the desired spattering data and the position and orientation information from the spatial referencing unit 30 in order to spatter the desired logo onto the door.

Figure 8:
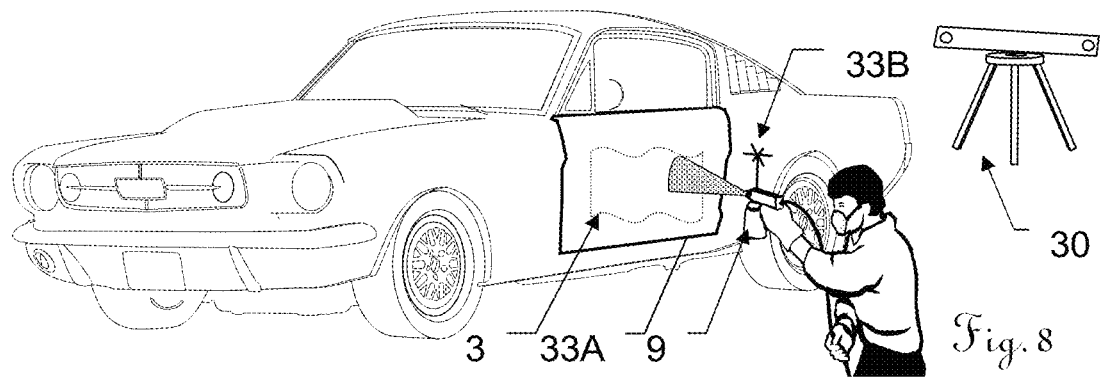
FIG. 8 shows a an exemplary embodiment of a graphical application system according to the present invention with a handheld surface spattering device referenced by a multiple camera unit according to a visible feature attached to the spattering device.

In FIG. 8 a similar setup is shown, but therein a handheld spattering device 9 is used, which is spatially referenced by the spatial referencing unit 30 by the thereto attached visual feature 33B in form of a LED arrangement with known geometry. The spatial referencing unit also evaluates visible features 33A of the car 26, for example the contours 33A of the door. The thereby established position and orientation reference is used by the computation unit to control the nozzle means in such a way, that the desired spattering data is applied to the target location at the door. To achieve such, the operator of the spattering device can be guided to follow an optimized path as described above.

Figure 9:
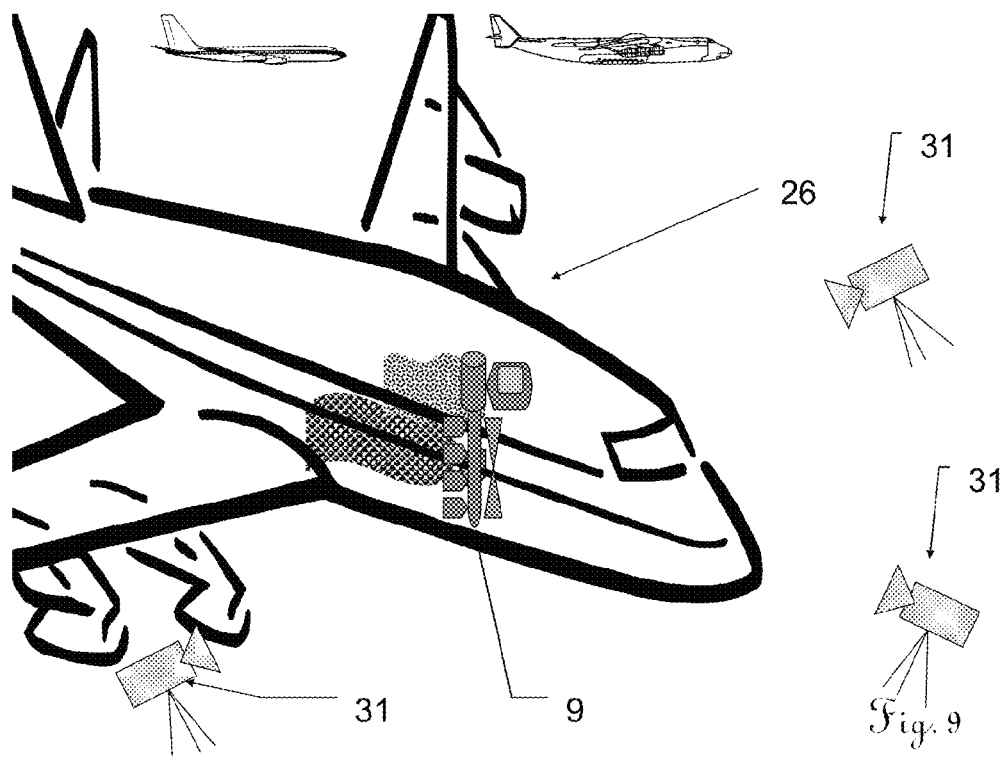
FIG. 9 shows an exemplary embodiment of a graphical application system according to the present invention which is spattering a large, free form shaped three dimensional object.

As shown in FIG. 9, the graphical application system according to the invention is used to apply a desired pattern 6 to the curved surface of an aircraft 26 by the surface spattering device 9 and the spatial referencing system with the cameras 31.

Figure 10:
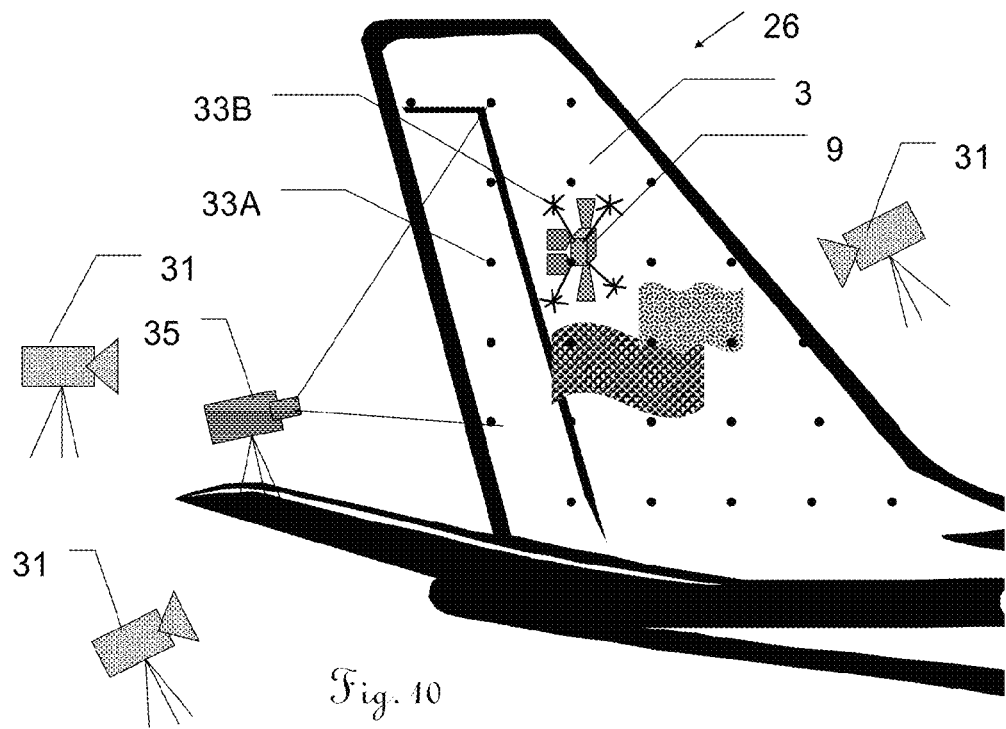
FIG. 10 shows another exemplary embodiment of a graphical application system according to the present invention which is spattering a large, free form shaped three dimensional object with visual features projected onto the target.

In FIG. 10, the example of the target surface 3 is also on an aircraft vehicle 26. There is a first set of visual features 33B attached to the surface spattering device 9. A second set of visual features 33A is applied to the target surface 3. In order to not hinder the spattering process, the visual features 33A at the target surface 3 are projected by the light source 35 stationed at the target surface 3 and remote from the cameras 31 of the spatial referencing unit. The cameras 31 are located at different viewing angles to avoid an obstruction of their field of view by the operator of the spattering device 9. The more than two cameras 31, are arranged in such a way, that at least two cameras 31 can always observe the visual features 33A and 33B and thereby allowing a valid determination of position and orientation. In case the position and orientation can not be determined by the camera based spatial referencing unit, an additional IMU at the spattering device 9 can take over the position and orientation determination. At least for a short time until the obstruction has ended and the spatial referencing system is out malfunction and back to normal operation. The IMU can also be involved to assist the camera based spatial referencing for example for gaining additional information of the spattering device's tilt or to compensate for high dynamic movements of the spattering device 9.

Figure 11:
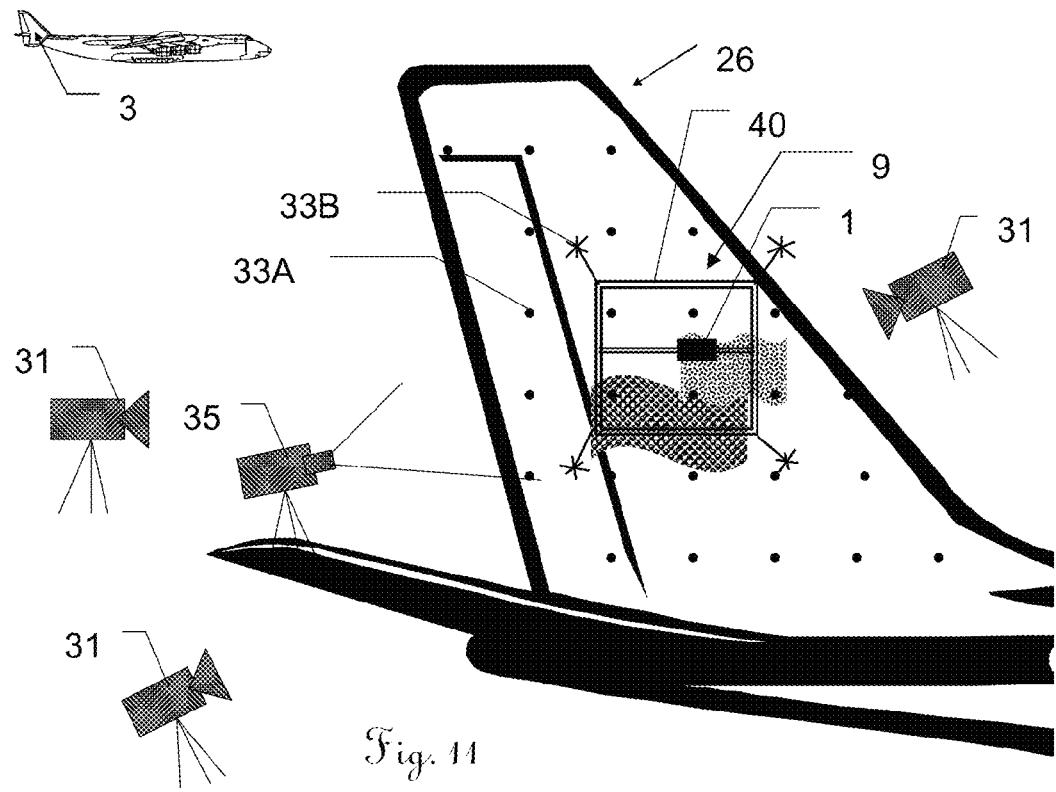
FIG. 11 shows an exemplary embodiment of a graphical application system according to the present invention with a nozzle means that is positioned within a body of the spattering device and which body is spatially referenced by a multiple camera setup and visible features.

FIG. 11, shows another similar setup of the graphical application system according to the invention. In comparison to the previous figure, the spattering device 9 comprises a body 40 with a therein movable nozzle means. As the position of the nozzle within the spattering device 9 is known by its positioning unit, the spatial referencing system only has to establish a position and orientation of the spattering device 9 relative to the target 3, according to the visual reference marks 33A,33B at the body of the spattering device 9. The spattering device 9 itself can be temporarily attached to the target 3, for example by suction cups, belts, clamps, screws, etc. If the spatterable range of spattering device 9 (given by its positioning system) is spattered, the whole spattering device 9 is detached, relocated at the target surface 3 and attached again.

According to the new position and orientation of the spattering device 9, determined by the spatial referencing unit, the spattering can be continued. A desired spattering data being larger than the spattering device's range can thereby be applied to the target surface 3 in multiple tiles which are accurately positioned and oriented with respect to each other and to the target surface 3. In an optional embodiment, the visual features 33A,33B can also be attached directly to the movable nozzle means and its spatial position and orientation relative to the target is directly determined by the visual spatial referencing unit with the cameras 31.

Figure 12:
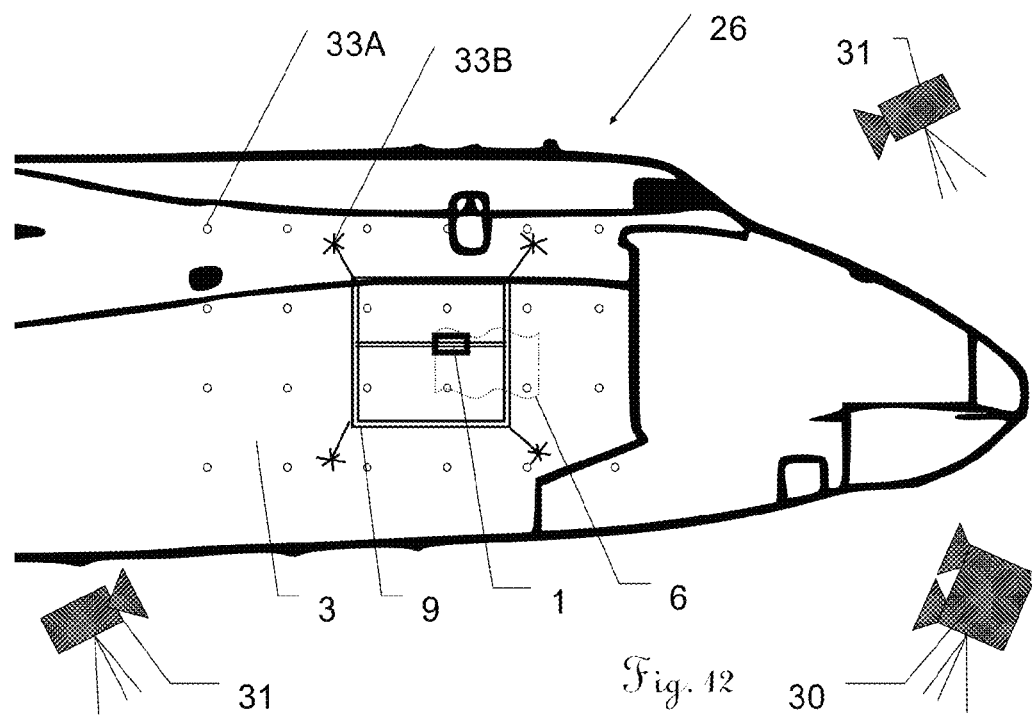
FIG. 12 shows another exemplary embodiment of a graphical application system according to the present invention with visual features attached to the target surface and the spattering device.

FIG. 12, the shows another similar embodiment, where the visual features 33A at the target are reference markers adhered to the target surface 3. The spatial referencing unit comprises a stereographic imaging unit 30 and two additional standalone cameras 31 for enhancing the visual coverage of the spatial referencing system and to gather more redundant data which can be used to enhance accuracy by means of interpolation, a least square fit, etc.

We claim:

1. A graphical application system, comprising:
 a surface spattering device, including:
  at least one nozzle means for expelling a spattering material onto a target surface;
  a nozzle control mechanism to control characteristics of the expelling of the at least one nozzle means; and
  a spattering material supply;
 a spatial referencing unit to reference the surface spattering device in space for determining a position and orientation of the surface spattering device;
 a computation means to automatically control the expelling by the nozzle control mechanism according to information gained by the spatial referencing unit and according to predefined desired spattering data as a digital image or a CAD-model comprising a digital representation of a desired pattern to be spattered onto the target surface, in such a way that the target surface is spattered according to the desired spattering data; and
 a communication means for establishing a communication link from the spatial referencing unit to the computation means to supply the position and orientation to the computation means, wherein:
  the spatial referencing unit is located remote from the surface spattering device and includes a 3D imaging unit with:
   at least two optical 2D cameras arranged with a stereobasis in between the cameras, the 3D imaging unit being designed for determining the position and orientation of the surface spattering device by digital image processing of images taken by the cameras,
   an identification means built to identify a visual feature in the images;
   a measuring means built to determine picture coordinates of the visual feature; and
   a 3D modeling means built to determine position and orientation according to the picture coordinates and geometrical constraints given by the stereobasis,
 wherein the determination of the spatial reference is done in at least five degrees of freedom.

2. A graphical application system as claimed in claim 1, wherein the spattering device includes:
 a first set of visual features which is built in such a way, that the position and orientation of the surface spattering device is determinable by the spatial referencing unit, wherein the visual features are objects of known geometrical shape which are attached to the surface spattering device as reference marks, and wherein the first set of visual features is actively emitting optical radiation.

3. A graphical application system as claimed in claim 1 wherein a second set of visual features is located at the target surface, wherein the visual features are objects of known geometrical shape which are attached to the target surface as reference marks.

4. A graphical application system as claimed in claim 3, wherein the second visual features at the target surface are projected light marks, which are projected from a location with a fixed position relative to the target surface and which location is dislodged from the spatial referencing unit.

5. A graphical application system as claimed in claim 1, wherein the surface spattering device includes an inertial measurement unit that is incorporated in the position and orientation determination when the spatial referencing unit is temporary malfunctioning because of an obstruction of a cameras field of view.

6. A graphical application system as claimed in claim 1, wherein the surface spattering device includes:
  additional sensor means for determining target surface properties and environmental conditions, spattered and non-spattered areas, present spattering thickness, present surface colour, whereof a drying condition of the spattering material is determined and incorporated in the control of the expelling characteristics; and/or
  a distance meter for evaluating a distance between the at least one nozzle means and the target surface.

7. A graphical application system as claimed in claim 1, wherein:
  the application system is built for spattering non-flat, curved free form target surface according to the desired spattering data.

8. A graphical application system as claimed in claim 1, wherein:
  the application system is built for spattering non-flat, curved free form target surface according to the desired spattering data for bodies of vehicles such as cars or aeroplanes and the desired spattering data comprises a three dimensional model of the target surface.

9. A graphical application system as claimed in claim 1, wherein the surface spattering device includes a positioning unit for a positioning of the at least one nozzle means in at least two degrees of freedom, with respect to a body of the surface spattering device, which body comprises means to be temporarily fixed in its position relative to the target surface.

10. A graphical application system as claimed in claim 9, wherein the body is equipped with the visual features for the spatial referencing unit and the body is referenced to the target by the spatial referencing unit and the at least one nozzle means is referenced to the body by the positioning unit for an indirect/mediated referencing of the at least one nozzle means to the target surface.

11. A graphical application system as claimed in claim 9, wherein the at least one nozzle means is equipped with the visual features for the spatial referencing unit and the at least one nozzle means is directly referenced to the target by the spatial referencing unit.

12. A graphical application system as claimed in claim 1, wherein the surface spattering device is handheld and comprises the visual features built in such a way to achieve a uniquely identifiable spatial reference of the surface spattering device by the spatial referencing unit.

13. A graphical application system as claimed in claim 1, wherein the spatial referencing unit references the surface spattering device in space relative to the target surface for determining a position and orientation of the surface spattering device.

14. A graphical application system as claimed in claim 1, further comprising a computer program product comprising program code stored on a machine-readable medium, that when executed by a computer causes the computer to perform the method comprising:
  computing the desired expelling characteristics of at least one nozzle means required to spatter a target surface by at least one layer of one or more spattering materials, resulting in a spattering of the target surface according to a desired spattering data by commanding a nozzle control mechanism which is capable of adjusting the expelling characteristics of the at least one nozzle means, and based on spatial referencing data of the at least one nozzle means relative to the target surface.

15. A computer program product as claimed in claim 14, wherein method is performed on a handheld spattering device.

* * * * *